(12) United States Patent
Pasini et al.

(10) Patent No.: US 11,946,560 B2
(45) Date of Patent: Apr. 2, 2024

(54) PNEUMATIC VALVE

(71) Applicant: THE ROYAL INSTITUTION FOR THE ADVANCEMENT OF LEARNING/MCGILL UNIVERSITY, Montréal (CA)

(72) Inventors: Damiano Pasini, Montréal (CA); Lu Liu, Beijing (CN); Chuan Qiao, Montreal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 107 days.

(21) Appl. No.: 17/655,942

(22) Filed: Mar. 22, 2022

(65) Prior Publication Data
US 2022/0299129 A1   Sep. 22, 2022

Related U.S. Application Data

(60) Provisional application No. 63/164,117, filed on Mar. 22, 2021.

(51) Int. Cl.
*F16K 31/00* (2006.01)
*F04B 45/053* (2006.01)
(Continued)

(52) U.S. Cl.
CPC .......... *F16K 31/003* (2013.01); *F04B 45/053* (2013.01); *F16K 31/1268* (2013.01); *F16K 31/12* (2013.01)

(58) Field of Classification Search
CPC .... F16K 31/12; F16K 31/003; F16K 31/1268; F15B 7/08; F04B 45/053
See application file for complete search history.

(56) References Cited

U.S. PATENT DOCUMENTS 2,888,877 A * 6/1959 Shellman ............... F04B 43/09
                                                          417/474
3,078,679 A * 2/1963 Mortimer ................. F15B 7/08
                                                          92/92
(Continued)

FOREIGN PATENT DOCUMENTS

EP          3032152 A1 *  6/2016   ............... B67C 3/28

OTHER PUBLICATIONS

A soft ring oscillator, Daniel J. Preston, Preston et al., Sci. Robot. 4, eaaw5496 (2019) Jun. 26, 2019.
(Continued)

*Primary Examiner* — Umashankar Venkatesan
(74) *Attorney, Agent, or Firm* — Norton Rose Fulbright Canada LLP

(57) ABSTRACT

A valve for a pneumatic system, has: a first enclosure defining a first chamber and a first connection port; a second enclosure defining a second chamber and a second connection port; a first shell subjected to a first pressure differential and movable from a default position to a reversed position via snap-through buckling upon the first pressure differential reaching a threshold; and a second shell having a shape different than a shape of the first shell, the second shell resiliently movable from an initial position to a deformed position when subjected to a second pressure differential, wherein a first flow rate of a fluid via the first connection port induces deformation of the second shell followed by a snapping of the first shell thereby generating a second flow rate greater than the first flow rate.

12 Claims, 14 Drawing Sheets

(51) Int. Cl.
*F16K 31/126* (2006.01)
*F16K 31/12* (2006.01)

(56) References Cited

U.S. PATENT DOCUMENTS

| | | | | |
|---|---|---|---|---|
| 3,426,800 | A * | 2/1969 | Bauer | F15C 3/08 |
| | | | | 235/201 ME |
| 3,508,848 | A * | 4/1970 | Schmidlin | F04B 53/1077 |
| | | | | 417/395 |
| 3,770,012 | A * | 11/1973 | Bitzer | G11B 5/5521 |
| | | | | 235/201 ME |
| 3,845,777 | A * | 11/1974 | Gilson | F16K 31/36 |
| | | | | 239/66 |
| 4,594,890 | A * | 6/1986 | Baker, Jr. | G01F 1/54 |
| | | | | 73/269 |
| 4,969,424 | A * | 11/1990 | Klomp | F16K 31/0641 |
| | | | | 123/73 V |
| H928 | H * | 6/1991 | Gallegos | F04B 45/053 |
| | | | | 417/395 |
| 9,441,743 | B2 * | 9/2016 | Storm | F16K 11/022 |
| 10,781,807 | B2 * | 9/2020 | Hannemann | F04B 43/009 |
| 2018/0298896 | A1 * | 10/2018 | Lynn | A61H 1/0281 |
| 2023/0294016 | A1 * | 9/2023 | Shukla | B01D 15/1842 |
| | | | | 210/656 |

OTHER PUBLICATIONS

A soft, bistable valve for autonomous control of soft actuators, Philipp Rothemund, Rothemund et al., Sci. Robot. 3, eaar7986 (2018) Mar. 21, 2018.

Digital logic for soft devices, Daniel J. Preston, Preston et al. PNAS, Apr. 16, 2019, vol. 116, No. 16.

Simple Passive Valves for Addressable Pneumatic Actuation, Nils Napp, Published in: 2014 IEEE International Conference on Robotics and Automation (ICRA).

Soft kink valves, Kai Luo, Journal of the Mechanics and Physics of Solids, Available online Jul. 11, 2019.

* cited by examiner

PNEUMATIC VALVE

CROSS-REFERENCE TO RELATED APPLICATIONS

This application claims priority from U.S. patent application 63/164,117 filed on Mar. 22, 2021. Its content is incorporated herewith in its entirety.

TECHNICAL FIELD

This disclosure generally relates to the field of robotics and, more particularly, to a pneumatic valve used in the field of soft robotics where highly compliant materials, similar to those found in living organisms, are used.

BACKGROUND

Pneumatic soft robotics aim at expanding the scope of current robotic applications. Distinct from classical rigid body robots, their pneumatic soft counterparts are typically fabricated from soft materials, such as elastomers, that can undergo large deformations to accomplish complex tasks. A diverse range of input sources are typically used to drive their motion; some resort to internal pressurized air, and others to external propellers, such as roller modules or moveable bodies. Functions that have been realized span a broad spectrum of motion, from locomotion, including galloping, swimming, crawling, and climbing, to manipulation, such as gripping, stirring, and swallowing.

An advantage offered by soft robots is that their elastic modulus is similar to that of soft biological tissues, imparting in them the ability to easily adapt to the local profile of adjacent objects, and making them suitable for applications that involve delicate interactions with humans, the handling of fragile objects, and the adaptation to unknown environments. Pneumatic soft robots do not always require a complex system of actuators, sensors and control algorithms, as rigid body robots typically do; rather their working principle is to express function mainly in a passive way, through either "morphological computation" involving compliance programming or "embodied intelligence". Others of their advantages include low mass and cost, high cycle life, and damage resistance to impact.

Rapid actuation of soft pneumatic robots is commonly realized through pressure-controlled strategies that engage a bulky system of pressure supply, sensors, and hard valves along with control algorithms. Specifically, rapid motion in soft pneumatic robots is typically achieved through actuators that either use a bulky system of pressure supply and pressure control, employ an integrated power source, such as chemical explosions, or are designed to embed elastic instabilities in the body of the robot.

Improvements are therefore sought.

SUMMARY

In one aspect, there is provided a valve for a pneumatic system, comprising: a first enclosure defining a first chamber and a first connection port of the valve, the first connection port communicating with the first chamber; a second enclosure defining a second chamber and a second connection port of the valve, the second connection port communicating with the second chamber; a first shell subjected to a first pressure differential between a pressure of the first chamber and one of a pressure of the second chamber and a pressure of an environment outside both of the first chamber and the second chamber, the first shell movable from a default position to a reversed position via snap-through buckling of a membrane of the first shell upon the first pressure differential reaching a threshold; and a second shell having a shape different than a shape of the first shell, the second shell resiliently movable from an initial position to a deformed position when subjected to a second pressure differential between the pressure of the first chamber and the other of the pressure of the second chamber and the pressure of the environment, wherein a first flow rate of a fluid via the first connection port induces deformation of the second shell from the initial position to the deformed position followed by a snapping of the first shell from the default position to the reversed position thereby generating a second flow rate of the fluid via the second connection port, and followed by a movement of the second shell back toward the initial position, the second flow rate greater than the first flow rate during a movement of the first shell from the default position to the reversed position.

The valve may include any of the following features, in any combinations.

In some embodiments, the first shell is a spherical cap.

In some embodiments, the first shell is made of an elastomeric material.

In some embodiments, the second shell is a hemispherical cap with an axisymmetric defect.

In some embodiments, the second shell is convex but for at the axisymmetric defect.

In some embodiments, the axisymmetric defect is defined by a concave portion of the second shell.

In some embodiments, a profile of the axisymmetric defect is an elliptical arc.

In some embodiments, the second shell has a first section, a second section, and a third section between the first section and the second section, the axisymmetric defect located at the third section, the first section and the second section being defined by portions of a sphere.

In some embodiments, the first shell separates the first chamber from the second chamber, the first pressure differential defined between the pressure of the first chamber and the pressure of the second chamber.

In some embodiments, the second shell separates the first chamber form the second chamber, the second pressure differential defined between the pressure of the first chamber and the pressure of the second chamber.

In some embodiments, the second enclosure is secured to the first enclosure.

In another aspect, there is provided a pneumatic system, comprising the valve described above.

In yet another aspect, there is provided a method of manufacturing a valve for a pneumatic system, the valve having a first shell and a second shell, the method comprising: obtaining a required a volume output and a required energy output of the valve in function of requirements of the pneumatic system; determining first parameters of the first shell in function of the required volume output and the required energy output; determining second parameters of the second shell in function of the first parameters and in function of the required volume output and the required energy output; and manufacturing the valve per the first parameters of the first shell and the second parameters of the second shell.

The method may include any of the following features, in any combinations.

In some embodiments, the determining of the first parameters of the first shell includes generating a design space of the first shell.

In some embodiments, the generating of the design space of the first shell includes performing simulations by successively varying the first parameters and obtaining a maximum volume output and a maximum energy output of the first shell for each of the first parameters.

In some embodiments, the first parameters are a first ratio (t1/R) of a thickness of the first shell to a radial distance between a periphery of the first shell to an apex of the first shell and a second ratio (h/R) of a height of the first shell from the periphery to the apex and the radial distance.

In some embodiments, the determining of the second parameters of the second shell includes generating a design space of the second shell.

In some embodiments, the generating of the design space of the second shell includes performing simulations by successively varying the second parameters and obtaining a volume output and an energy output of the valve for each of the second parameters.

In some embodiments, the second parameters are a third ratio (t2/R) of a thickness of the second shell to a radial distance between a periphery of the second shell to an apex of the second shell, a lower angle extending from the periphery of the second shell to a start of a defect in the second shell, and an upper angle extending along the defect of the second shell.

In some embodiments, the method includes determining an output volume and an output energy of the valve in function of the determined first parameters and the determines second parameters; if the output volume and the output energy correspond to the required output volume and the required output energy, manufacturing the valve; or if the output volume and the output energy are off from the required output volume and the required output energy, performing steps a) to c) until the determined output volume and output energy of the valve correspond to the required output volume and the required output energy.

In one aspect, there is provided a bi-shell valve for a soft robot, comprising: a first enclosure defining a first chamber and an inlet, the inlet communicating with the first chamber; a second enclosure sealingly engaged to the first enclosure, the second enclosure defining a second chamber and an outlet, the outlet communicating with the second chamber; a first shell sealingly engaged to the first enclosure and defining a boundary of both of the first chamber and the second chamber, the first shell movable from a first position in which the first shell extends inside the second chamber to a second position in which the first shell extends inside the first chamber, the first shell being deformable by snap-through buckling from the first position to the second position; and a second shell different than the first shell, the second shell sealingly engaged to the first enclosure and located outside the second chamber, the first shell defining another boundary of the first chamber, the second shell resiliently movable from an initial position to a deformed position, wherein a first flow rate of a compressible fluid via the inlet induces deformation of the second shell from the initial position to the deformed position followed by a snapping of the first shell from the first position to the second position thereby generating a second flow rate of the compressible fluid via the outlet, the second flow rate greater than the first flow rate, and followed by a movement of the second shell back toward the initial position.

In some embodiments, the first shell is a spherical cap.

In some embodiments, the first shell is made of an elastomeric material.

In some embodiments, the second shell is a hemispherical cap with an axisymmetric defect.

In some embodiments, the axisymmetric defect is defined by a concave portion of the second shell, a profile of the axisymmetric defect being an elliptical arc.

In some embodiments, the second shell has a first section, a second section, and a third section between the first section and the second section, the axisymmetric defect located at the third section, the first section and the second section being defined by portions of a sphere.

In another aspect, there is provided a method of manufacturing a bi-shell valve for a pneumatic system, the bi-shell valve having a first shell sealingly engaged to a first enclosure, a second shell sealingly engaged to the first enclosure, and a second enclosure sealingly engaged to the first enclosure, the first shell disposed between the first enclosure and the second enclosure, the method comprising: determining a required a volume output and a required energy output of the bi-shell valve in function of requirements of the pneumatic system; determining first parameters of the first shell in function of the determined required volume output and energy output; determining second parameters of the second shell in function of the first parameters and in function of the determined required volume output and energy output; and manufacturing the bi-shell valve per the determined first parameters of the first shell and the determined second parameters of the second shell.

In some embodiments, the determining of the first parameters of the first shell includes generating a design space of the first shell.

In some embodiments, the generating of the design space of the first shell includes performing simulations by successively varying the first parameters and obtaining a maximum volume output and a maximum energy output of the first shell for each of the first parameters.

In some embodiments, the first parameters are a first ratio (t1/R) of a thickness of the first shell to a radial distance between a periphery of the first shell to an apex of the first shell and a second ratio (h/R) of a height of the first shell from the periphery to the apex and the radial distance.

In some embodiments, the determining of the second parameters of the second shell includes generating a design space of the second shell.

In some embodiments, the generating of the design space of the second shell includes performing simulations by successively varying the second parameters and obtaining a volume output and an energy output of the bi-shell valve for each of the second parameters.

In some embodiments, the second parameters are a third ratio (t2/R) of a thickness of the second shell to a radial distance between a periphery of the second shell to an apex of the second shell, a lower angle extending from the periphery of the second shell to a start of a defect in the second shell, and an upper angle extending along the defect of the second shell.

In some embodiments, the method comprises: determining an output volume and an output energy of the bi-shell valve in function of the determined first parameters and the determines second parameters; if the output volume and the output energy correspond to the required output volume and the required output energy, manufacturing the bi-shell valve; or if the output volume and the output energy are off from the required output volume and the required output energy, performing steps a) to c) until the determined output volume and output energy of the bi-shell valve correspond to the required output volume and the required output energy.

In one aspect, there is provided a bi-shell valve that uses a syringe dispensing slowly volume input to deliver fast output motion in a controlled fashion and fully passive way. The disclosed bi-shell valve may generate rapid actuation upon deflation. Its architecture may encompass a spherical cap and an imperfect shell with a geometrically tuned defect nested onto an input chamber connecting their inner volumes. The disclosed spherical cap sets the threshold of the snapping pressure along with the upper bounds of volume and energy output the valve can deploy, while the imperfect shell interacts with the cap to operate and deliver the desired output for actuation of soft robots. The disclosed bi-shell valve mainly operates through deflation, yet the concept is versatile, and geometry variations are provided to show it can also function as rapid inflation valve and pneumatic volume fuse. Harnessing shell snapping interaction can endow the soft valve with the capacity to actuate a striker that propels the motion of an object along a guided track.

Many further features and combinations thereof concerning the present improvements will appear to those skilled in the art following a reading of the instant disclosure.

DETAILED DESCRIPTION

Figure 1:
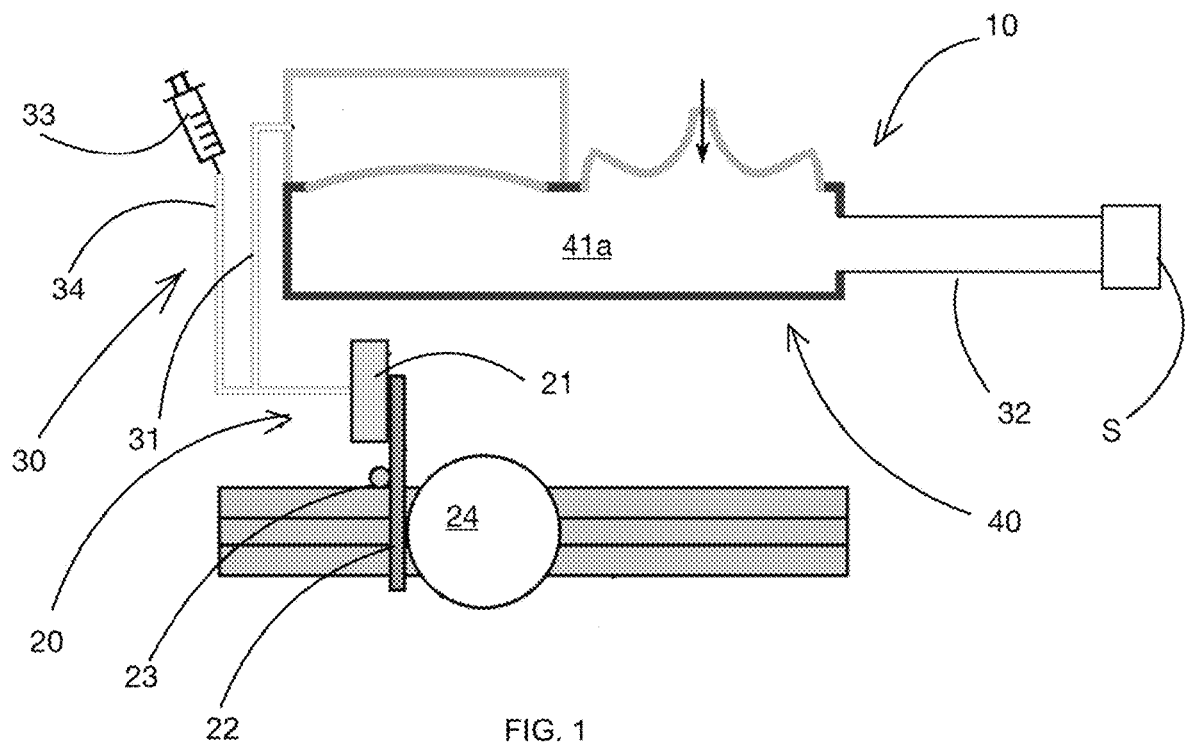
FIG. 1 is a cross-sectional view of a bi-shell valve in accordance with one embodiment illustrated as part of a pneumatic system, the bi-shell valve shown in an undeformed state.

There is disclosed a bi-shell valve that may fast actuate soft robots neither relying on pressure control strategies nor requiring modifications to the architecture of the robot. The bi-shell valve may have a spherical cap and an imperfect shell with a geometrically tuned defect that may enable shell snapping interaction to convert a slowly dispensed volume input into a fast volume output. The spherical cap may set the threshold of the snapping pressure along with the upper bounds of volume and energy output, while the imperfect shell interacts with the cap to store and deliver the desired output for rapid actuation. Geometry variations of the bi-shell valve are provided, e.g. pneumatic volume fuses, to show that the concept is versatile. A final demonstration shows that the soft valve can quickly actuate a striker within 0.16 seconds.

The most widely used method to fluidly actuate soft robot is pressure control, applied successfully to trigger motion of soft robots of various size. With this strategy, actuation can be rapid and inflation can occur at high speed through the delivery of high pressure low viscosity air, and/or by further optimizing the actuator design with the outcome of reducing the amount of air required for actuation. While effective, pressure-controlled actuation has a twofold drawback. First, for pressure generation and control, it requires a bulky pneumatic system that typically includes a pressure supply (e.g. air pumps or compressed gas tanks) and a set of hard valves (e.g. pressure regulators and solenoid valves). Secondly, fine control over the change in volume is difficult to achieve. For a soft robot, this might pose a problem. If motion is driven by the emergence of unstable events, the soft robot might lose its capacity to function properly. For example, a spherical cap embedded into a soft robot that is driven by external pressure will snap from the initial to its fully everted configuration, leaving no chance to access any intermediate states of deformation; if motion requires operation at these states, the soft robot will inevitably fail to do so.

An alternative to pressure-controlled actuation is volume control. This strategy allows for direct adjustment of the volume change. For example, a syringe pump can be used to dispense a precise volume of a fluid into the soft robot, and its pressure-volume response can be registered. Besides this advantage, controlling the output volume avoids any jumps in displacement that a pressure control strategy would impose upon snap-through buckling. Volume control strategies used so far, however, have a common drawback; they are unable to drive fast actuation, a limitation ascribed to the limited flow rate that a syringe pump can typically deliver.

Pneumatic soft robots typically resort to elements other than actuators to operate. One of them is valves. Their function so far has been other than that of actuators. Current valves can control the fluid flow spreading throughout the body of a soft robot. Some concepts comprise rigid elements that can provide a simple and unambiguous control of a fluid flow. Others achieve this function by engaging elastic instabilities, e.g. wrinkling, snapping, and creasing, in their constituents. Sources used to initiate elastic instabilities include air pressure supply, external force, and viscous flux through unstable-arch channels. In all cases, the fluid-control function these valves perform is binary, switching between two distinct states.

Bi-Shell Valve

Referring to FIG. 1, a pneumatic system 10, which may be used as part of a soft robot, is shown. The pneumatic system 10 includes a pneumatic actuator 20, a pneumatic circuit 30, and a valve 40 used for controlling a motion of the pneumatic actuator 20. In the embodiment shown, the valve 40 is pneumatically connected to the pneumatic actuator 20 via a first conduit 31 and the valve 40 is pneumatically connected to a source S of a compressed fluid via a second conduit 32. Herein, the expression "source of a compressed fluid" denotes anything able to either suction a compressible fluid from the valve 40 or inject the compressible fluid to the valve 40. The source may be, for instance, a compressor, a pump, and so on. The pneumatic circuit 30 may include a pressure-control device 33 pneumatically connected to the first conduit 31 via a third conduit 34 and operable to vary a pressure in the pneumatic circuit 30. In the embodiment shown, the pressure-control device 33 is a syringe, but any other suitable means are contemplated. Moreover, it is understood that the illustrated pneumatic system 10 is exemplary only and that a plethora of possible pneumatic connections and possible implementations of the valve 40 are contemplated without departing from the scope of the present disclosure.

Figure 2:
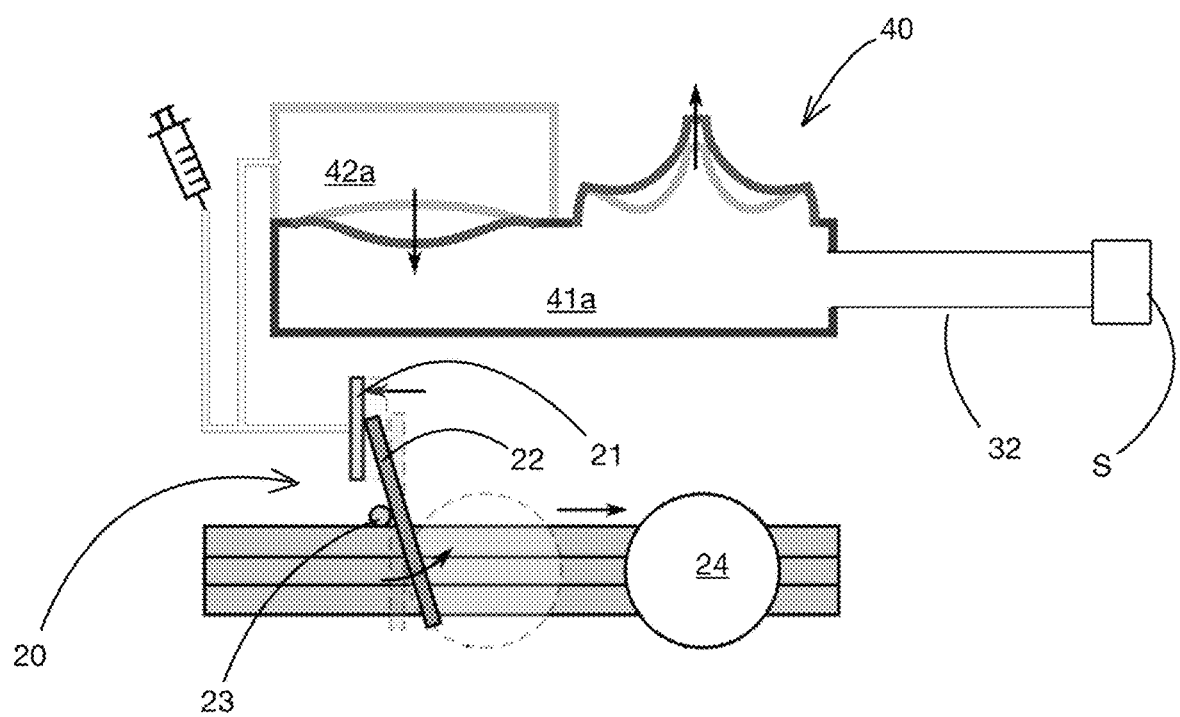
FIG. 2 is a cross-sectional view of the bi-shell valve of FIG. 1 integrated in the pneumatic system, the bi-shell valve shown in a deformed state.

In the embodiment shown, the pneumatic actuator 20 includes an airbag 21 secured to a striker 22; the striker 22 being pivotably connected to a pivot 23 to rotate about the pivot 23 for the purpose of hitting a target, such as a ball 24. The ball 24 may be constrained to moving in translation, such as by being mounted to a slotted rail, as shown. The airbag 21 is pneumatically connected to the first conduit 31 of the pneumatic circuit 30. In the embodiment shown, the pressure-control device 33 is used for inflating the airbag 21. Upon deflation, the airbag 21 rotates a lever secured to the airbag 21 about a pivot for pushing on the ball 24. Again, this pneumatic actuator 20 is exemplary and any other suitable actuator using a compressible fluid as a working medium is contemplated without departing from the scope of the present disclosure. As shown in FIG. 2, and as described in further detail below, by suctioning the compressed fluid out of the valve 40, the pneumatic actuator 20 exhibits a fast deflation of the airbag 21 to push the ball 24, or like trigger. It is understood that, in a particular embodiment, the valve 40 may be used to quickly inflate the airbag 21 to push the ball directly.

Figure 3:
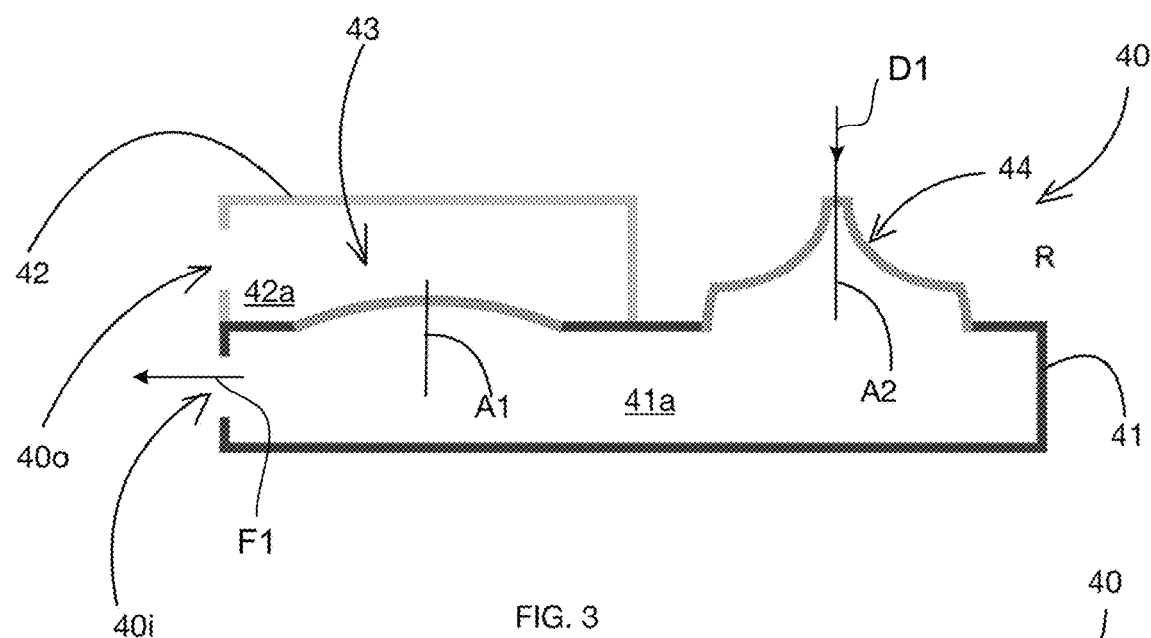
FIG. 3 is a cross-sectional view of the bi-shell valve of FIG. 1 shown in the undeformed state.

Referring now to FIG. 3, the valve 40 is described in detail. The valve 40 includes a first enclosure 41 defining an a first chamber 41a and a second enclosure 42 defining a second chamber 42a. The second enclosure 42 is sealingly engaged to the first enclosure 41. A first elastic shell 43 and a second elastic shell 44 are sealingly engaged to a wall of the first enclosure 41 and define portion of a boundary of the first chamber 41a. In other words, inner surfaces of the first shell 43 and the second shell 44 are exposed to an interior of the first chamber 41a. Stated differently, inner volumes defined by the first shell 43 and the second shell 44 are fluidly connected to the first chamber 41a. The first shell 43 is exposed to a first pressure differential between a pressure of the first chamber 41a and a pressure of the second chamber 42a. The second shell 44 is exposed to a second pressure differential between the pressure of the first chamber 41a and a pressure of an environment outside the valve 40, and outside the first and second enclosures 41a, 42a. The first shell 43 and the second shell 44 may both be axisymmetric about respective central axes A1, A2. More detail about geometric parameters of the first shell 43 and the second shell 44 are described below with reference to FIGS. 8-9.

Figure 4:
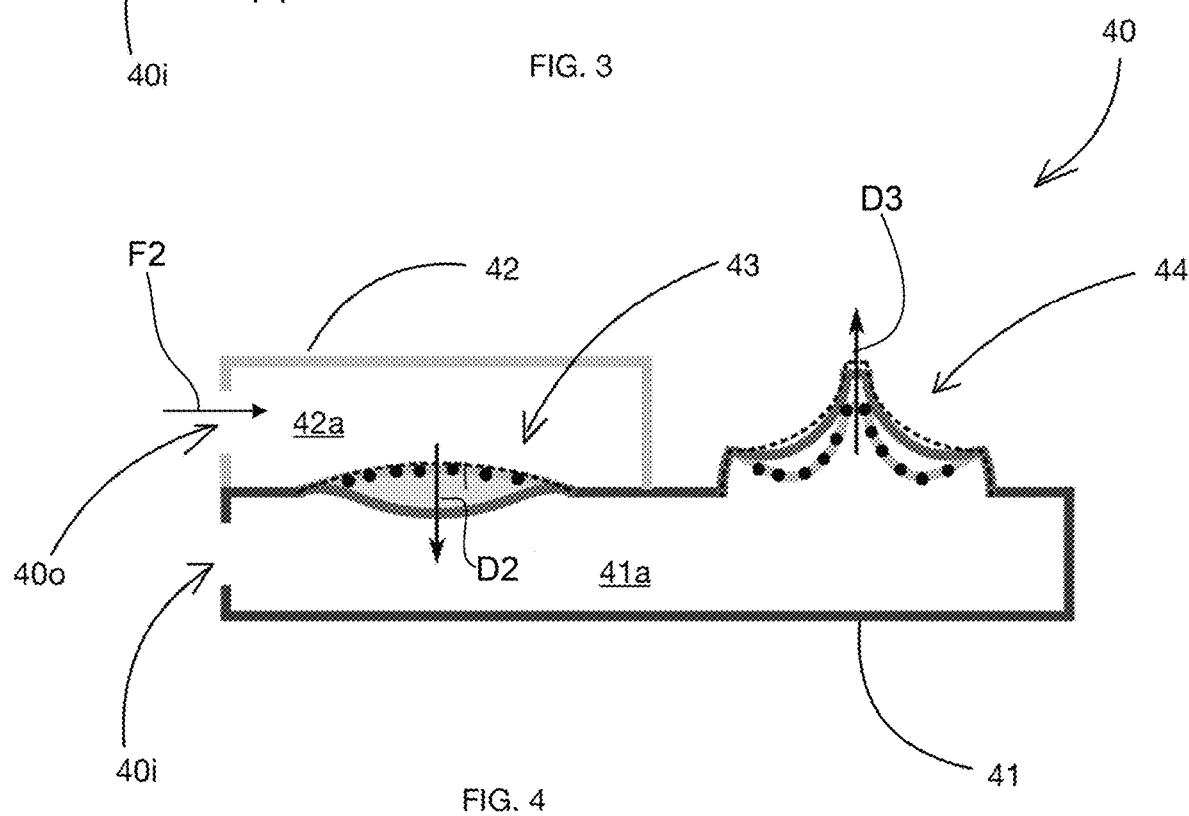
FIG. 4 is a cross-sectional view of the bi-shell valve of FIG. 1 shown in the deformed state.

The first shell 43 and the second shell 44 are two interacting elastic shells that cooperate upon snapping to generate a rapid change in volume in response to a slow volume input. The valve 40 is shown in its undeformed or native state in FIG. 3. FIG. 4 shows the bi-shell valve 40 in its undeformed or native state with dotted lines and in its deformed state with solid lines. Beneath the shells, the first chamber 41a, also referred to as the input chamber, is exposed to the first shell 43 and of the second shell 44 and provides deflation under volume control as well as pressure control, if required. In the embodiment shown, the first shell 43 is a frusto-spherical cap that exhibits an unstable response, which may be typical of elastic thin shells with a high peak of pressure attained in the nearly undeformed state, followed in turn by a rapid fall of pressure into a plateau leading to full eversion. In the depicted embodiment, the second shell 44 is a hemispherical shell featuring a large axisymmetric imperfection in the form of an elliptical arc traced away from the pole. Other shapes are contemplated for the imperfection. The second shell 44 may be frusto-spherical. This imperfect shell is selected for its stable response over a large change in volume that can be effectively tuned by the geometry of the imperfection, thus attaining a capacity to provide increasing pressure resistance. This is described in more detail below with reference to FIG. 9. The expression "pressure resistance" as used in the present disclosure means how a shell resists to a variation of a pressure differential applied on its opposite sides. For instance, if a shell exhibits an increase in pressure resistance with an increase of a pressure differential, it implies that the more the shell is deformed because of this pressure differential, the more it resists deformation.

The first shell 43 separates the first chamber 41a from the second chamber 42a. In other words, the first shell 43 is subjected to a fluid pressure from both of the first chamber 41a and the second chamber 42a such that an increase in the fluid pressure in the first chamber 41a beyond the fluid pressure in the second chamber 42a may induce movement of the first shell 43 along its central axis A1. The valve 40 has a first connection port, also referred to as an inlet 40i in this disclosure and a second connection port, also referred to as an outlet 40o in this disclosure. The inlet and the outlet may be interchanged. That is, in some embodiments, the inlet 40i is used as an outlet of the valve 40 whereas the outlet 40o is used as an inlet. Moreover, the expressions "inlet" and "outlet" do not imply a direction of a flow within the valve 40. That is, a fluid may be suctioned out of the valve 40 via the inlet. Similarly, a fluid may be pushed out of the valve 40 via the outlet. The inlet 40i is pneumatically connected to the source S of the compressed fluid whereas the outlet 40o is pneumatically connected to the pneumatic actuator 20. The inlet 40*i* communicates with the first chamber 41*a*. The outlet 40*o* communicates with the second chamber 42*a*. Other configurations are contemplated.

Still referring to FIGS. 3-4, a sequence of movements of the valve 40 is described. The valve 40 allows to produce a first flow rate through the outlet 40*o* from a second flow rate through the inlet 41*i*. The second flow rate through the inlet 41*i* is smaller than the first flow rate. In the embodiment shown, the compressed fluid is suctioned out of the first chamber 41*a* at the second flow rate from the inlet 40*i* along a flow direction F1. This induces a movement of the second shell 44 in a downward direction D1 from its initial shape shown with a dashed line to an intermediate shape shown with the dotted line. The defect in the second shell 44 allows the second shell 44 to move along the direction D1 with a decrease of the pressure inside the first chamber 41*a*. However, because of its shape, the first shell 43 resists deformation. During the suctioning of the compressed fluid out of the first chamber 41*a*, a shape of the first shell 43 remains substantially the same as depicted with the dotted and dashed lines. At some point, a pressure difference between the first chamber 41*a* and the second chamber 42*a* is such that the first shell 43 moves in a downward direction D2 toward to the first chamber 41*a*. In other words, the first shell 43 moves from its default position shown in FIG. 3 to its reversed position shown in FIG. 4 upon the first shell 43 being subjected to a pressure differential greater than a given threshold. The movement of the first shell 43 from the default to the reversed positions is sudden. It "snaps" in the reversed position by a buckling effect. The default position of the first shell 43 corresponds to a position the first shell 43 will revert to by itself if no force or pressure is exerted on it. In other words, upon the removal of the pressure differential, the first shell 43 may automatically and by itself resume its default position shown in FIG. 3. The first shell 43 may therefore be stable only in its default position and may be unstable in its reversed position. The first shell 43 snaps in its second position shown with the solid line in FIG. 4. Substantially at the same time, the second shell 44 moves upwards along direction D3 away from the first chamber 41 to its final position depicted with the solid line. In other words, the second shell 44 resiliently move from an initial position depicted in FIG. 3 to a deformed portion shown with the dotted line in FIG. 4 upon the second shell 44 subjected to the second pressure differential. The initial position of the second shell 44 may be a position in which the second shell 44 reverts to by itself when no force or pressure is exerted on it. The snapping of the first shell 43 creates a fast and sudden increase in the volume of second chamber 42*a*. This results in the fluid being drawn into the second chamber 42*a* along a second flow direction F2 via the outlet 40*o* thereby deflating the airbag 21 (FIGS. 1-2).

Stated differently, FIG. 4 illustrates that a slow deflation of the first chamber 41*a* through the inlet 40*i* brings each of the first shell 43 and the second shell 44 into different states. At the onset of deflation, which is illustrated with the dotted lines, the pole of the second shell 44 deforms downward, whereas the first shell 43 barely undergoes any deformation, hence retaining its initial state. After snapping, which is shown with the solid lines, the second shell 44 springs back approaching its initial state, whereas the first shell 43 everts downward, along direction D2, from its initial upward position.

By combining the different architectures of the first shell 43 and of the second shell 44, such as a perfect spherical cap and an imperfect shell, each with its own distinct response, into one bi-shell valve 40, it may be possible to program a mechanism of deformation, to impart a desired sequence of deflation, and to code the global performance of the valve 40. It may be possible to capitalize on shell snapping interaction to generate a function that adds to the control-flow function of existing soft valves that would be otherwise unattainable through current concepts involving either snapping of a single spherical cap or other strategies. This is described in more detail below with reference to FIG. 10.

Performance of the valve 40 is dictated by respective movements of the first shell 43 and the second shell 44. The second shell 44 resiliently moves downwardly following the suctioning of the compressible fluid (e.g., air) from the first chamber 41*a*. At the same time, a pressure applied on the first shell 43 increases. At some point, the pressure on the first shell 43 is such that the first shell 43 snaps downward thereby providing a fast flow rate via the outlet 40*o* of the valve 40 along the flow direction F2. The flow rate at the outlet 40*o* is greater than the flow rate at the inlet 40*i*. Herein, the flow rate at the outlet 40*o* is measured during the snapping of the first shell 43. In other words, the flow rate at the outlet 40*o* may be substantially zero while the flow rate at the inlet 40*i* during the deformation of the second shell 44 is non-zero. However, during the snapping of the first shell 43, the flow rate at the outlet 40*o*, which is generated by the snapping of the first shell 43, is greater than the flow rate at the inlet 40*i*. In the embodiment shown, this fast flow rate is a flow rate of the compressible fluid that enters the second chamber 42*a* thereby deflating the airbag 21. This fast flow rate may be used to actuate any suitable actuators. The airbag 21 is merely an example of one of many possible applications in soft robotics. However, the fast flow rate via the outlet 40*o* of the valve 40 is possible because of the movement of the second shell 44 toward its initial shape because of its elasticity. In other words, the second shell 44, when deformed, exert a force to revert back toward its initial, undeformed position, such as a spring. When the first shell 43 snaps downwardly as shown in FIG. 4, it pushes a volume of air into the first chamber 41*a*. This pushed volume of air is accommodated by the movement of the second shell 44 back toward its initial position. Stated differently, because the second shell 44 forces to spring back toward its initial position, when the first shell 43 snaps, the volume of compressible fluid pushed in the first chamber 41*a* is rapidly balanced by the motion of the second shell 44 toward its initial position to allow the snapping of the first shell 43. If the second shell 44 were absent, a snapping motion of the first shell 43 might not be as fast since the first shell 43 would have to compress a volume of air in the first chamber 41*a*. But, since the second valve 44 "absorbs" the volume of air pushed by the first shell 43 into the first chamber 41*a*, the first shell 43 is able to snap rapidly without having to overcome a resistance that it would have to overcome if it were required to compress the compressible fluid in the first chamber 41*a*. It will be appreciated that the disclosed valve may be used with an incompressible fluid (e.g., water).

Referring back to FIG. 2, after inflation of the airbag 21, the pressure-control device 33 ceases to provide any increase of air volume. At which point, deflation of the first chamber 41*a* is applied at a low flow rate to enable a pressure in the first chamber 41*a* underneath the first shell 43 and the second shell 44 to reach the buckling load of the first shell 43. At this stage, the first shell 43 snaps downward and swiftly engages the second shell 44 to snap upward. Shell cooperation is now capitalized. The elastic energy and volume change hoarded in the second shell 44 before snapping is now released to propel fast deflation of the first shell 43. Since the second chamber 42a surrounding the first shell 43 is connected to the airbag 21, the accrued rapid volume change is dispensed to fast deflate the airbag 21. Since the first conduit 31 connecting the valve 40 and the actuator 20 may be short, the flow resistance or backpressure of the first conduit 31 may be negligible. As a result, the upper part of the stick retracts and swings backward around the pivot, whereas its lower portion knocks the ball forward, away from its initial position.

Deflation of the input chamber at the inlet 40i of the valve 40 may be carried out at a constant flow rate of about 3 mL/min. After snapping, the airbag 21 deflates almost instantly until air exhaustion, a condition where the airbag 21 becomes fully rigid. The absence of air in the airbag 21 may impede the first shell 43 to reach full eversion, rather only a dimple forms on its top.

To further prove that the fast movement of the striker is enabled by the bi-shell valve 40, two additional tests that compare the striker actuation in two scenarios were performed: one with the bi-shell valve 40 and the other without the valve 40. For the first test, the striker is connected to the bi-shell valve and slowly deflate the valve 40 at a constant flow rate of 3 mL/min. The airbag 21 quickly deflates within 0.16 s upon snapping. For the second test, the bi-shell valve 40 is removed and the airbag 21 is directly deflated at the identical flow rate (3 mL/min). It was observed that the airbag 21 slowly shrinks to the fully deflated state over about 13 seconds, which is roughly 80 times slower than the first test. The comparison of these test results attests that the bi-shell valve 40 is responsible for the fast movement of the striker. In summary, the experiments above demonstrate that the bi-shell valve 40 may achieve fast actuation through a slow volume input (output in this case). The disclosed valve 40 may leverages shell cooperation and snapping interaction to quickly impart a fast volume change that can be used for actuation.

It will appreciated that the pneumatic system 10 in which the valve 40 is employed is exemplary only and that the disclosed valve 40 may be used in any other suitable pneumatic applications. For instance, the valve 40 may be used in soft robots where fast actuation is required. The valve 40 may be pneumatically connected to any suitable pneumatic actuators such as actuators for galloping, jumping, tossing or hitting objects on target, and so on.

Behavior of the Bi-Shell Valve

Figure 5:
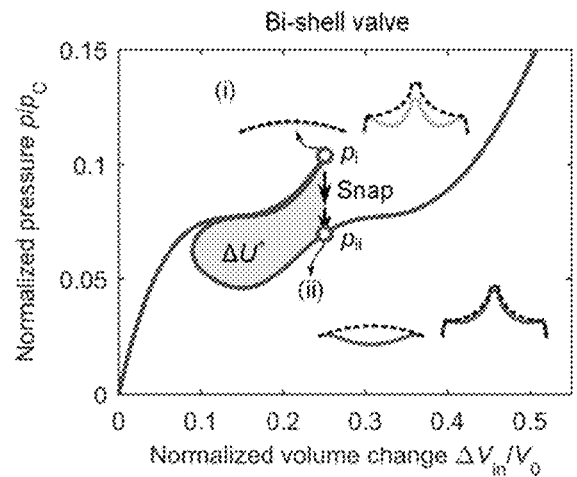
FIG. 5 is a graph illustrating a variation of pressure in function of a variation of volume for the bi-shell valve of FIG. 3.

FIG. 5 illustrates the snapping behaviour in quantitative terms. The concerted response of the first shell 43 and the second shell 44 to deflation obtained through numerical analysis is plotted on the characteristic axes (normalized pressure versus volume change). While deflation can be expected to generate negative values of both volume and pressure, here their signs are considered as positive for the convenience of the analysis. The portion of the curve up to (i) describes the initial deformation prior to snapping when the pressure hits the snapping pressure. A further deflation triggers a snap-through instability with a configurational change in both of the first shell 43 and the second shell 44, now reaching simultaneously their second state (ii) of equilibrium. The process is characterized by a drop of pressure with the first shell 43 eversion synchronous to the snap back of the second shell 44. Since the outer side of the first shell 44 is enclosed by the second chamber 42a, its downward snapping produces a rapid change in volume, which is bounded by the pre- and post-snapping states of the first shell 43 in the second chamber 42a. The hallmark of this concept is that the release of volume to slow deflation is fast and would be otherwise inaccessible by employing either shell individually. As per the energy and volume change in the first chamber 41a, the snapping event causes a release of the previously stored elastic energy in both of the first shell 43 and the second shell 44, but with almost no change in volume (less than 0.54% of the total volume); this outcome is due to the extremely small difference in pressure (less than 550 Pa) between the first chamber 41a and an environment outside both of the first chamber 41a and the second chamber 42a.

As described above, the deformation of the valve 40 is the result of the collective response of the first shell 43 and the second shell 44, each cooperating distinctly during deflation and snapping. To understand the interaction between them and each of their roles, here it is examined each shell separately, investigate their individual responses when deflated separately, and correlate them to the system behavior.

Figure 6:
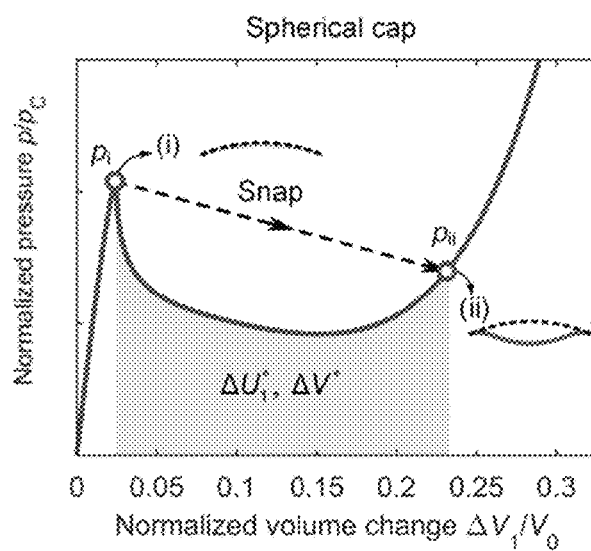
FIG. 6 is a graph illustrating a variation of pressure in function of a variation of volume for a first shell of the bi-shell valve of FIG. 3.
Figure 7:
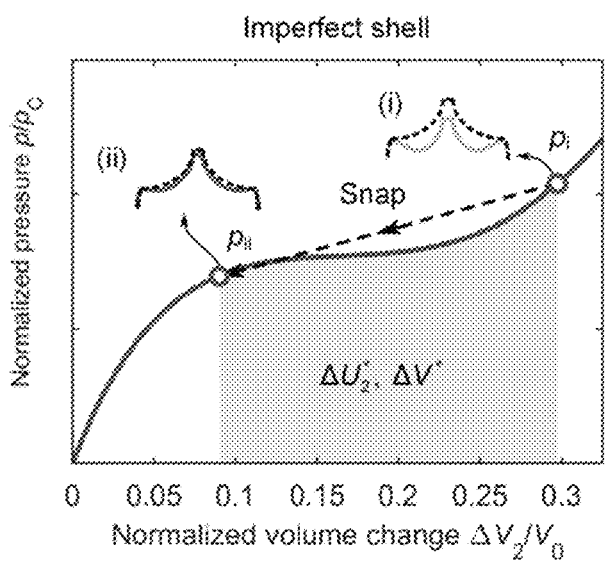
FIG. 7 is a graph illustrating a variation of pressure in function of a variation of volume for a second shell of the bi-shell valve of FIG. 3.

FIG. 6 pertains to the first shell 43 on its own, and FIG. 7 to the second shell 44 on its own. The first shell 43 shows the characteristic highly unstable response of a perfect elastic shell. A small volume change makes the pressure quickly escalate to a high critical value, which immediately drops to a lower plateau, spanning a wide range of volume change. After the plateau, the pressure increases rapidly again. There is no limit point in volume because the first shell 43 selected here is thick and shallow. In the present embodiment, the elements that are important to trigger snapping are the initial peak in pressure, the subsequent softening, and a final increase in pressure. The second shell 44 exhibits a stable pressure response over an increasing volume change, and its buckling mode is enabled by the size and location of the imperfection. The pressure-volume path has three portions: an initial rapid increase of pressure for small values of the volume change, followed by a stable plateau offering a gradual increase of pressure for intermediate values, and finally a steep increase of pressure. While the solid lines in FIGS. 5-7 represent the static equilibrium responses of each system, the dashed lines with arrow mark the direction from the pre to the post snapping state.

Once the first shell 43 and the second shell 44 join through the first chamber 41a, a concerted deformation (FIG. 5) takes place to ensure equilibrium of volume and pressure. Equilibrium requires the balance of their pressure in the stable post-snapping state. The conservation of volume requires the input volume change to equal the sum of the volume changes of the first shell 43 and the second shell 44. The onset of snapping is mainly controlled by the first shell 43, which upon winning the critical pressure, cannot accommodate any further increase in pressure, resulting in a sudden drop of pressure due to its elastic instability (FIG. 6). It is this event that triggers the snapping of the first shell 43 and the second shell 44 (dashed lines FIGS. 5-7). Each shell springs into its own snapped state in a swift manner. During snapping, the first shell 43 collapses due to its reduced pressure resistance and propels the air in the first chamber 41a towards the second shell 44 for an upward push; the sudden deflation of the first shell 43 inflates the second shell 44.

As with other forms of elastic deformation, during snapping each of the first shell 43 and the second shell 44 can store and release elastic energy, and their amounts correlate with those of the entire system. In particular, the deflation of the first shell 43 by a volume change is accompanied by the storage of elastic energy, while the inflation of the second shell 44 by a volume corresponds to the elastic energy release. The difference between them is the elastic energy released by the bi-shell valve 40 due to the snapping of both the first shell 43 and the second shell 44.

First Shell

Figure 8:
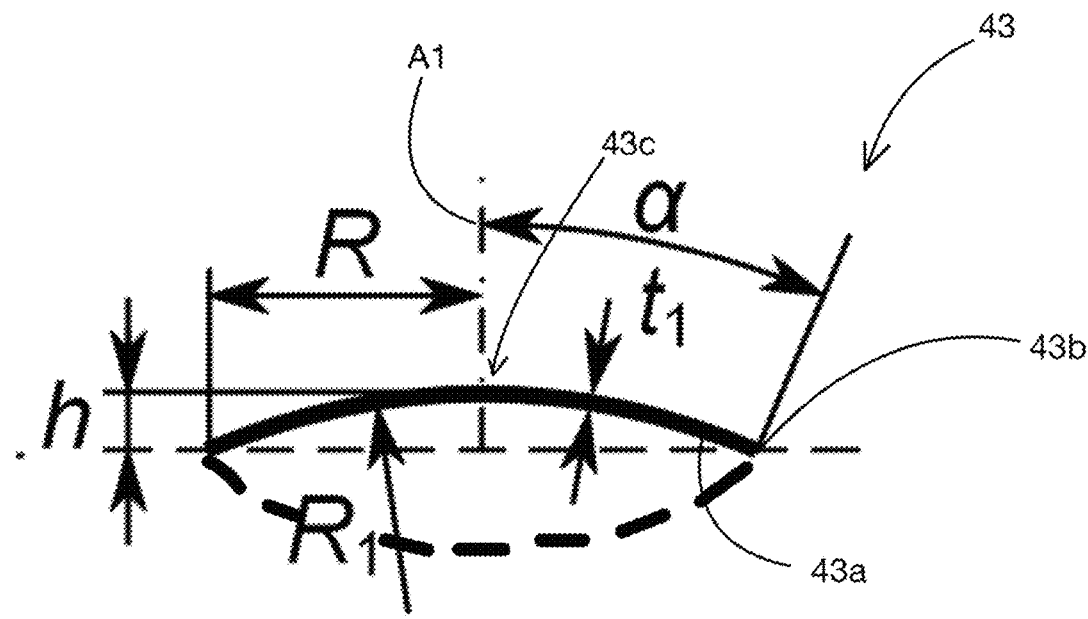
FIG. 8 is an enlarged cross-sectional view of the first shell of the bi-shell valve of FIG. 3.

Referring more particularly to FIG. 8, the first shell 43 is described in more detail. In the embodiment shown, the first shell 43 includes a first membrane 43a being flexible and having a first thickness t1. The first membrane 43a may be made of an elastomeric material. The first membrane 43a has a truncated spherical shape and is sealingly connected at its periphery 43b to a wall of the first enclosure 41 (FIG. 1). The spherical shape may have a first radius R1. The periphery 43b may be circular and may annularly extend all around the central axis A1 of the first shell 43. The first membrane 43a may move from a first, undeformed, position shown in FIG. 8 with a solid line to a second, deformed, position shown in FIG. 8 with a dashed line by a motion of the first membrane 43a as described herein above. The first valve 43 has a height h that corresponds to a distance along the central axis A1 from the periphery 43b to an apex 43c of the first membrane 43a. The first valve 43 has a radial dimension R extending in a radial direction relative to the central axis A1 from the periphery 43b to the apex 43c. An angle α is defined from a first ray coincident to the central axis A1 and intersecting a center of a sphere having the first radius R1 to a second ray intersecting the periphery 43b and the center of the sphere having the first radius R1.

The first shell 43 may be stable in the first position (solid line) and is movable between the first position and a second position (dashed line). When a pressure difference is exerted on the first valve 53 reaches a given threshold, it quickly moves away from the first position to the second position. In other words, the first shell 43 "snaps" towards the second position. This movement may be referred to as a "snapping" of the first valve 43. In other words, a force is required to move the first membrane 43a away from its first position. The first valve 43 may have any suitable shape able to undergo snap-through buckling. The first shell 43 stores energy while the second shell 44 releases energy during snapping. The first valve 43 may undergo snap-through buckling and decreases the pressure resistance. In the embodiment shown, the first valve 43 may be subject to snapping pressure in the first position (solid line) and a lower post-buckling pressure in the second position (dashed line). When the pressure acting on the first membrane 43a reaches the snapping pressure of the first membrane 43a, the first membrane 43a may move by itself to the second position. This movement may be referred to as a "snapping" of the first shell 43. As explained above, when the pressure difference between the first and second chambers 41a, 42a (FIG. 3) becomes sufficient, the membrane 43a may snap away from its first position into the second position thereby pushing a volume of air.

Second Shell

Figure 9:
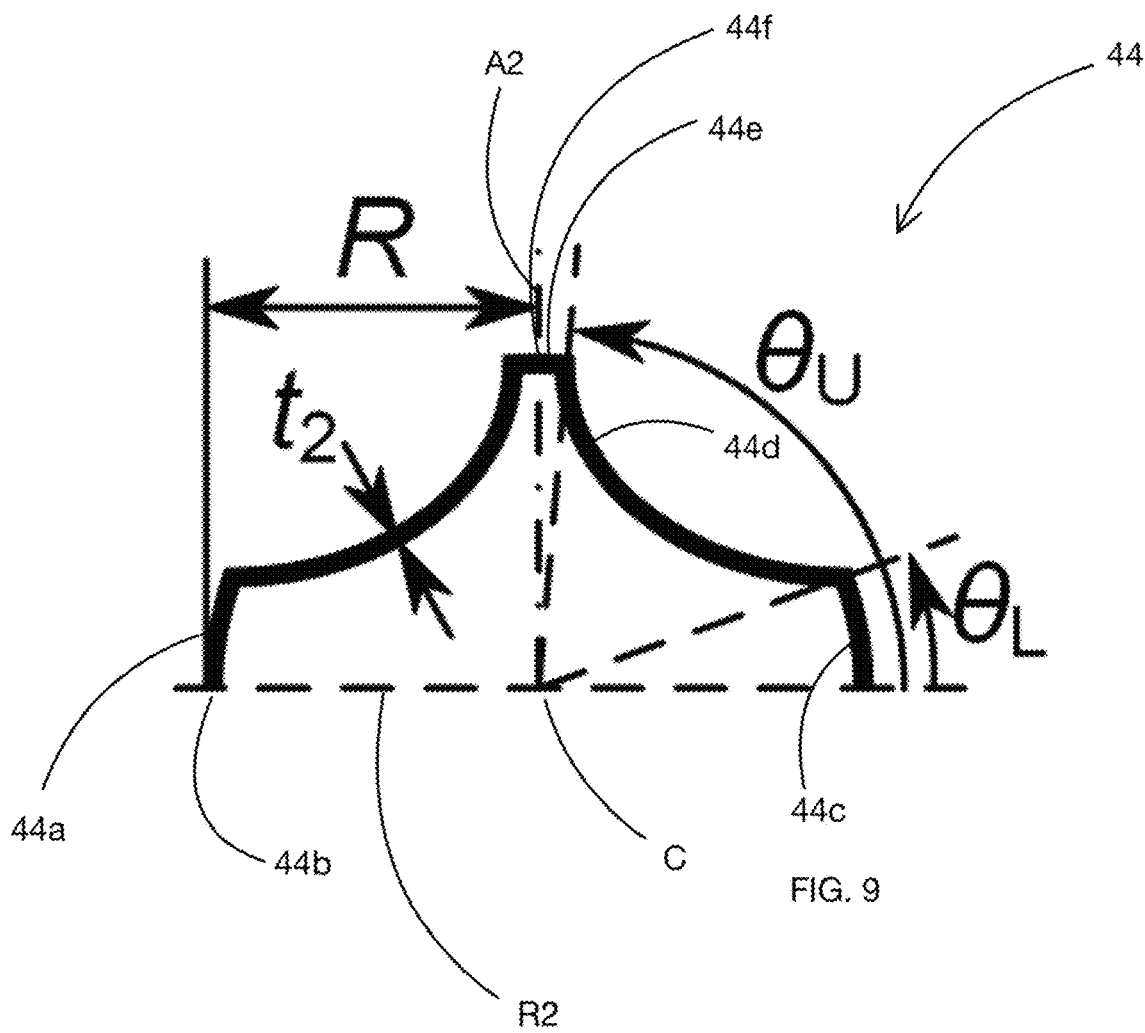
FIG. 9 is an enlarged cross-sectional view of the second shell of the bi-shell valve of FIG. 3.

Referring now to FIG. 9, the second shell 44 includes a second membrane 44a being flexible and having a second thickness t2. The second membrane 44a may be made of an elastomeric material. The second shell 44 has a periphery 44b sealingly engaged to a wall of the first enclosure 41. The second shell 44 has a first section 44c, a second section 44d, and a third section 44e. The first section 44c extends from the periphery 44b to an intersection with the second section 44d. The third section 44e extends from an apex 44f of the second membrane 44a to an intersection with the second section 44d. The second section 44d is therefore between the first section 44c and the third section 44e.

The first section 44c and the third section 44e are parts of an hemisphere having a second radius R2. In other words, the first section 44c and the third section 44e may be truncated spherical walls. The first section 44c may extend along a lower angle $\theta_L$ from a first ray intersecting the periphery 44b and a center C of the sphere to a second ray intersecting the intersection between the first section 44c and the second section 44d and intersecting the center C of the sphere. The second section 44d may extend along an upper angle $\theta_U$ extending from the second ray intersecting the intersection between the first section 44c and the second section 44d and intersecting the center C of the sphere to a third ray intersecting the intersection between the second section 44d and the third section 44e and intersecting the center C of the sphere.

The second section 44d is referred to in the present disclosure as a defect since it alters a continuity of a sphericity of the second membrane 44a. That is, the second membrane 44a may be hemispherical but for the second section 44d. The second shell 44 may be convex but for the defect. The defect may be axisymmetric. The second shell 44 may be concave at the defect. Any size and shape of defect allowing the second shell 44 to deform axially along the axis A2 when exposed to a pressure differential is contemplated. The relation between the pressure differential and the axial displacement of the second shell 44 may be linear in some embodiments. In some other embodiments, this relation may be non-linear (e.g., quadratic, cubic, or of a higher number). It can be a combination of linear and non-linear. The second section 44d is a concave portion of the second shell 44 when seen from outside the first chamber 41a (FIG. 1). The second section 44d is, in the embodiment shown, an axisymmetric imperfection in the form of an elliptical arc traced away from the pole. That is, the second section 44d may correspond to an arc of an ellipse that is rotated all around the central axis A2. A radius of the second section 44d may therefore vary between the first section 44c and the second section 44e. In the embodiment shown, the radius decreases toward the apex 44e. The second shell 44 may have any suitable shape able to exhibit an increase in pressure resistance over a large volume change. For instance, the second shell 44 may be a corrugated pipe made of a resilient material (e.g., elastomer. The shape of the defect may be anything described by the parametrized curve geometry described herein. The shape of the defect is selected to endow the imperfect shell 44 the necessary compliance to store the energy that will then be releases as soon as the perfect shell 43 snaps. It may be possible to imagine the imperfect shell 44 as the energy storage and the perfect shell 43 as the energy trigger that releases it.

All of the above described parameters and dimensions of the first shell 43 and the second shell 44 may be varied in order to achieve a desired maximum values of volume change and released energy of the bi-shell valve 40. It may therefore be possible to design the valve 40 for any suitable applications. This process of designing the valve 40 is described herein below.

Performance of the Bi-Shell Valve

The goal is to find the first two performance metrics of the bi-shell valve 40, i.e. the maximum values of volume change, $\Delta V^*_{upper}$, and released energy $\Delta U^*_{upper}$, the bi-shell valve 40 can attain. As described earlier, the first shell 43, which is a spherical cap, may set the upper performance limit of the bi-shell valve 40, and is studied here as stand-alone shell. The modified Riks method may be employed to simulate the deflation of the first shell 43 subject to uniform pressure and parametrically map $\Delta V^*_{upper}$ and $\Delta U^*_{upper}$ upon snapping.

As shown in FIG. 8, the parameters defining a geometry of the first shell 43 are the radius R in the base plane. The radius R is a distance from a periphery of the first shell 43 to a center of the first shell 43 taken in a radial direction relative to the central axis A1. In the embodiment shown, the radius R is 25 mm. The normalized thickness, which is a ratio of a thickness t1 of the first shell 43 to the radius R. The normalized thickness may be from about 0.01 to about 0.1. The normalized height, which is a ratio of a height h of the first shell 43 taken in an axial direction relative to the central axis A1. The normalized height may range from about 0.1 to 0.5.

To assess the snapping performance with respect to changes in shell geometry, a parameter of the first shell 43 is defined and incorporates the dimensionless size and thickness of the spherical cap. This is $\lambda=(12(1-v^2))^{1/4}(R_1/t_1)^{1/2}\alpha$ where $R_1$ is the radius of the spherical cap, $t_1$ is the thickness, $\alpha$ is the edge angle measured from the central axis A1 to the periphery of the first shell 43, and $v$ is the Poisson ratio. $\lambda$ enables for the discrimination of areas of the design space, normalized thickness $t_1/R$ versus normalized height $h/R$, with snap-through instability from those without. It was observed that for $\lambda<1.04$ the first shell 43 is thick and shallow, and no snap-through takes place; here there is only shell deflation with a smooth increase of pressure that cannot generate any rapid volume change. In contrast for $\lambda>1.04$, the first shell 43 is thinner and deeper in geometry, undergoes snap-through for all combinations of $t_1/R$ and $h/R$. It is observed that the maximum volume change $\Delta V^*_{upper}$ increases monotonically with the normalized height $h/R$ and its span is sizeable, from $\Delta V^*_{upper}/V_0=0$ to 0.75. The main implications is that a shell with higher $h/R$ in its initial state, inherently encloses a larger inner volume, thus outlining a geometry capable of generating large change in volume upon snapping to the fully everted state. On the other hand, compared to $h/R$, the normalized thickness $t_1/R$ exerts a minor influence on the volume change. As per the energy release, $\Delta U^*_{upper}$ increases from $\Delta U^*_{upper}/(EV_0)=0$ to 0.004 with both $h/R$ and $t_1/R$. In comparison, shells with larger $h/R$ can generate more ample change in volume during snapping, with a larger $t_1/R$ providing a higher pressure. The maximum released energy $\Delta U^*_{upper}/(EV_0)$ is obtained where both $h/R$ and $t_1/R$ take their largest values, and both volume and pressure changes have large values.

$\Delta V^*_{upper}$ and $\Delta U^*_{upper}$ set performance limits that apply to the bi-shell valve 40. $h/R$ and $t_1/R$ are the governing dimensionless parameters. Through the proper combination of their $h/R$ and $t_1/R$, it may be possible to program the max volume change and released energy of the valve from the geometry of the first shell 43 only. For example, a sufficiently large $h/R$ is needed to generate enough volume change and energy for soft actuators, whereas a small $h/R$ can limit the upper bound of volume change $\Delta V^*_{upper}$ and released energy $\Delta U^*_{upper}$ to within a safety threshold, e.g. to prevent accident in human-robot interaction. On the other hand, the normalized thickness $t_1/R$ may have low to mild influence on the volume change $\Delta V^*_{upper}$ but strong on the upper bound of the released energy $\Delta U^*_{upper}$.

Referring also to FIG. 9, while the first shell 43 snapping bounds the theoretical output of the bi-shell valve 40 $\Delta V^*_{upper}$ and $\Delta U^*_{upper}$ it is the interaction between the first shell 43 and the second shell 44 that governs the values of volume change $\Delta V^*$ and energy $\Delta U^*$ that the bi-shell valve 40 can actually release during operation. The objective here is to find this second set of metrics ($\Delta V^*$ and $\Delta U^*$) defining the bi-shell valve 40 performance. This may be carried by first prescribing the geometry of the first shell 43 ($t_1/R=0.05$, $h/R=0.2$ and $R=25$ mm), and then systematically exploring the design space of the second shell 44. This step entails finding the range of $\Delta V$ and $\Delta U$ that can be obtained by varying the normalized thickness, $t_2/R$ of the second shell 44. The normalized thickness is expressed as a ratio of a thickness t2 of the second shell 44 to the radius R of the second shell 44, which is a distance from a periphery of the second shell 44 to the central axis A2 of the second shell 44 along a radial direction relative to the central axis A2 of the second shell 44. In the embodiment shown, the normalized thickness of the second shell 44 ranges from 0.02 to 0.1 and meridional angles of the upper and lower boundaries, $\theta_U$ and $\theta_L$, range from 20° to 85°. The upper meridional angle is an angle spanned by a defect of the second shell 44. The lower meridional angle is an angle from the periphery of the second shell 44 to a start of the defect of the second shell 44.

It was observed that for $t_2/R\leq0.02$ no snapping occurs because the second shell 44 is much more compliant than the first shell 43 and collapse brings it to full eversion before the pressure is able to reach the snapping pressure of the first shell 43. For $0.02<t_2/R<0.035$, the volume change $\Delta V^*$ decreases with $t_2/R$ from 81% to 47% of the upper bound $\Delta V^*_{upper}$, and the released energy $\Delta U$ drops from 59% to 16% of the upper bound $\Delta U^*_{upper}$. Within this range, the minimum values of $\Delta V$ and $\Delta U$ are low compared to the upper bounds generated by the first shell 43; this implies that the second shell 44 may only trigger a small portion of $\Delta V^*_{upper}$ and $\Delta U^*_{upper}$. On the other hand, for $0.035<t_2/R<0.055$, both the volume change and released energy of the bi-shell valve 40 increase rapidly with $t_2/R$. The volume change ranges from $\Delta V^*/\Delta V^*_{upper}=0.49$ to 0.87 and the released energy ($\Delta U^*/\Delta U^*_{upper}$) spans the range 0.16-0.70. A further increase in $t_2/R$ leads to an abrupt drop in both volume change and released energy, followed by a plateau that gradually approaches the value of zero. For these shells, snapping offers very modest volume change and released energy.

If the meridional angles, $\theta_U$ and $\theta_L$, are both considered as design parameters, then a larger design space emerges for both $\Delta V^*/\Delta V^*_{upper}$ and $\Delta U^*/AU^*_{upper}$. Here the normalized thickness is prescribed to the value $t_2/R=0.05$ to ensure that $\Delta V^*/\Delta V^*_{upper}$ and $\Delta U^*/\Delta U^*_{upper}$ can take the largest output. For $\theta_L\leq33°$, it was observed that the volume change $\Delta V^*/\Delta V^*_{upper}$ first increases slowly with the upper meridional angle $\theta_U$ until an abrupt increase from $\Delta V^*/\Delta V^*_{upper}=0.3$ to 0.9 appears at $\theta_U=78.5°$. With further increase in $\theta_U$, the volume change $\Delta V^*/\Delta V^*_{upper}$ stays almost constant for the plotted range $\theta_U\leq85°$. For $\theta_L\leq33°$, an abrupt increase of released energy from $\Delta U^*/\Delta U^*_{upper}=0.15$ to 0.83, the maximum, appears at $\theta_U=78.5°$. A further increase in $\theta_U$, however, yields reduced values of the released energy, as opposed to $\Delta V^*/\Delta V^*_{upper}$ which remains almost constant for $\theta_U\geq78.5°$. The maximum values of the volume change $\Delta V^*$ and released energy $\Delta U^*$ may be attained in a narrow design space of the second shell 44. This zone may be key to maximize the valve output, i.e. to release a large amount of energy. Its extent is governed by the interaction between the first shell 43 and the second shell 44. In particular, the plateau pressure of the second shell 44 is located between the pre and post-snapping pressure $p_i$ and $p_{ii}$ of the first shell 43.

In summary, the upper bounds $\Delta V^*_{upper}$ and $\Delta U^*_{upper}$ and the valve 40 outputs $\Delta V^*$ and $\Delta U^*$ may provide guidelines of practical use for the design of the bi-shell valve 40. First, the upper bounds may guide the selection of the first shell 43 that has the potential to generate a proper valve output. Second, for a given first shell 43, the range of valve output that can be tuned with the geometry of the second shell 44 may identify distinct regimes of buckling modes. In this case, despite the size of the design space, only a small window is available for the second shell 44 to generate a valve output that is close to the upper bound. The insights here gained point out that $\theta_U=85.9°$ and $\theta_L=20°$ are among the best geometric parameters of the second shell 44 that may elicit the large volume change. A similar analysis may be applied to spherical caps with other geometries.

Valve Design and Manufacture

Figure 10A:
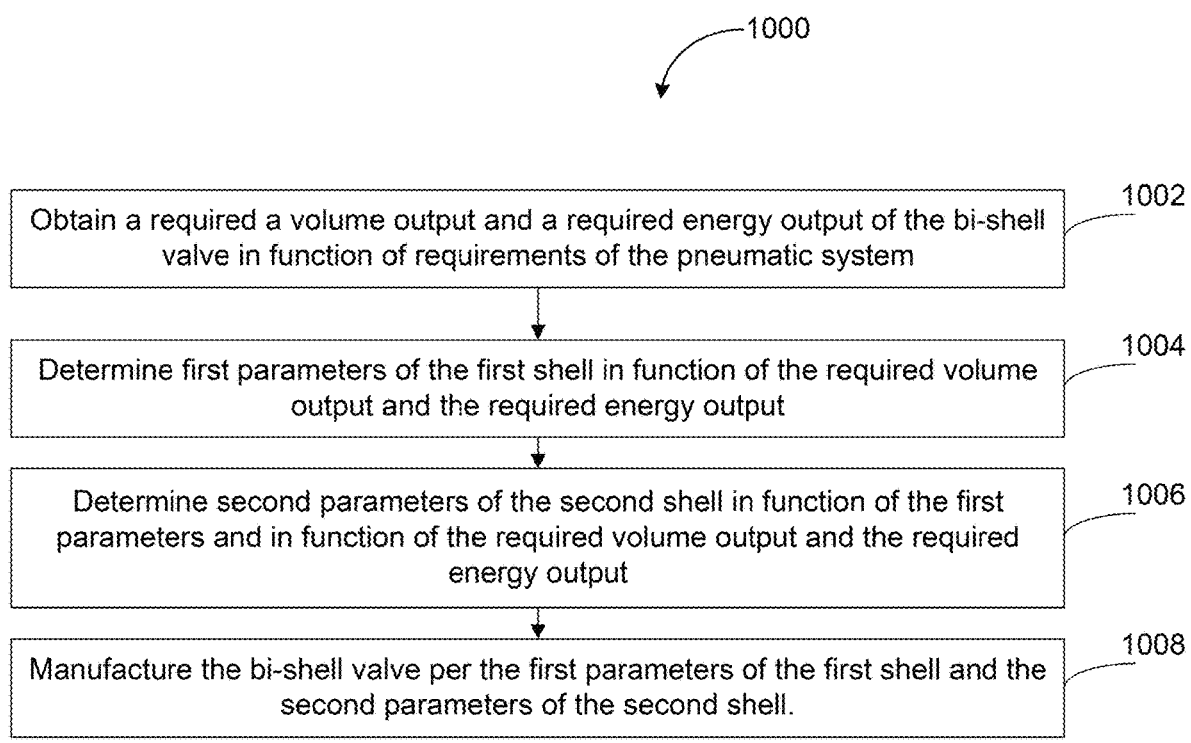
FIG. 10A is a flowchart illustrating steps of a method of manufacturing the bi-shell valve of FIG. 3.

Referring now to FIG. 10A, a method of manufacturing the bi-shell valve 40 is shown at 1000. The method 1000 includes obtaining a required a volume output and a required energy output of the bi-shell valve 40 in function of requirements of the pneumatic system at 1002; determining first parameters of the first shell 43 in function of the required volume output and the required energy output at 1004; determining second parameters of the second shell 44 in function of the first parameters and in function of the required volume output and the required energy output at 1006; and manufacturing the bi-shell valve 40 per the first parameters of the first shell 43 and the second parameters of the second shell 44 at 1008.

The results from analyses and experiments reveal that shell interaction governs the bi-shell valve 40 behavior, which in turn can be retrieved by combination of the individual shell response. These insights may not only enable the understanding of the role of each shell during snapping, but may also provide principles for valve design involving multiple shells. A two-steps approach, which includes steps 1004 and 1006, is proposed, where the bi-shell performance is defined by 4 metrics: the upper bounds of volume and energy, $\Delta V^*_{upper}$ and $\Delta U^*_{upper}$, as well as the working ranges of $\Delta V^*$ and $\Delta U^*$, i.e. the variation of volume change and released energy within their respective bounds. The process is depicted in FIG. 10 and includes a first step of examining the first shell 43 alone. This sets the valve performance limits, and aims at determining the upper bounds ($\Delta V^*_{upper}$ and $\Delta U^*_{upper}$) of the valve output. These bounds set the upper boundaries for the bi-shell valve performance, i.e. the bi-shell system with a given spherical cap cannot exceed them for any geometric scenario of the imperfect shell. In a second step, the attainable ranges of volume change $\Delta V^*$ and released energy $\Delta U^*$ for the bi-shell valve 40 is determined by exploring the design space of the second shell 44 for a prescribed geometry of the first shell 43. With this approach, one can ensure that the full potential of both shells is attained, thereby yielding a valve output close to the achievable maximum.

The method 1000 involves the 4 metrics: the upper bounds of volume and energy ($\Delta V^*_{upper}$ and $\Delta U^*_{upper}$) and the attainable ranges of output ($\Delta V^*$ and $\Delta U^*$) within their respective bounds.

In the step 1004 of determining the first parameters of the first shell 43, only the first shell 43 is analysed to identify the upper bounds ($\Delta V^*_{upper}$ and $\Delta U^*_{upper}$) of the output of the valve 40. These quantities set the performance limits imposed by the first shell 43 to a bi-shell system with any geometric parameters of the second shell. With these upper bounds, it is possible to select the geometry of the first shell 43 ($t_1/R$ and $h/R$) that meet the requirements of volume and energy output prescribed by a given application. These geometry may include a ratio of the first thickness t1 to the radius R, which corresponds to the distance from the periphery of the first shell 43 to a center of the first shell 43 taken in a radial direction relative to the central axis A1.

In the step 1006 of determining of the second parameters of the second shell 44, the emphasis shifts to the second shell 44, and the goal is to obtain the attainable ranges of volume change $\Delta V^*$ and released energy $\Delta U^*$ for the bi-shell valve 40 with the first shell 43 selected in the first step 101. This may be achieved by exploring a design space of the second shell 44. Then, the valve design may be completed by selecting a set of parameters of the second shell 44. These parameters may be a ratio of the second thickness t2 to the radius R, which corresponds to the distance from a periphery of the second shell 44 to a center of the second shell 44 taken in a radial direction relative to the central axis A2, the upper angle $\theta_U$, and the lower angle $\theta_L$ to meet the output requirements ($\Delta V^*$ and $\Delta U$) of the valve 40.

If no feasible design is found for the second shell 44, the process re-starts at the step 1002 of determining the first parameters of the first shell 43 to revise the design of the first shell 43. With this approach, it may be possible to ensure to fully tap into the full potential of both shells and obtain a valve output that is close to the achievable maximum.

Design of the First Shell

Figure 10B:
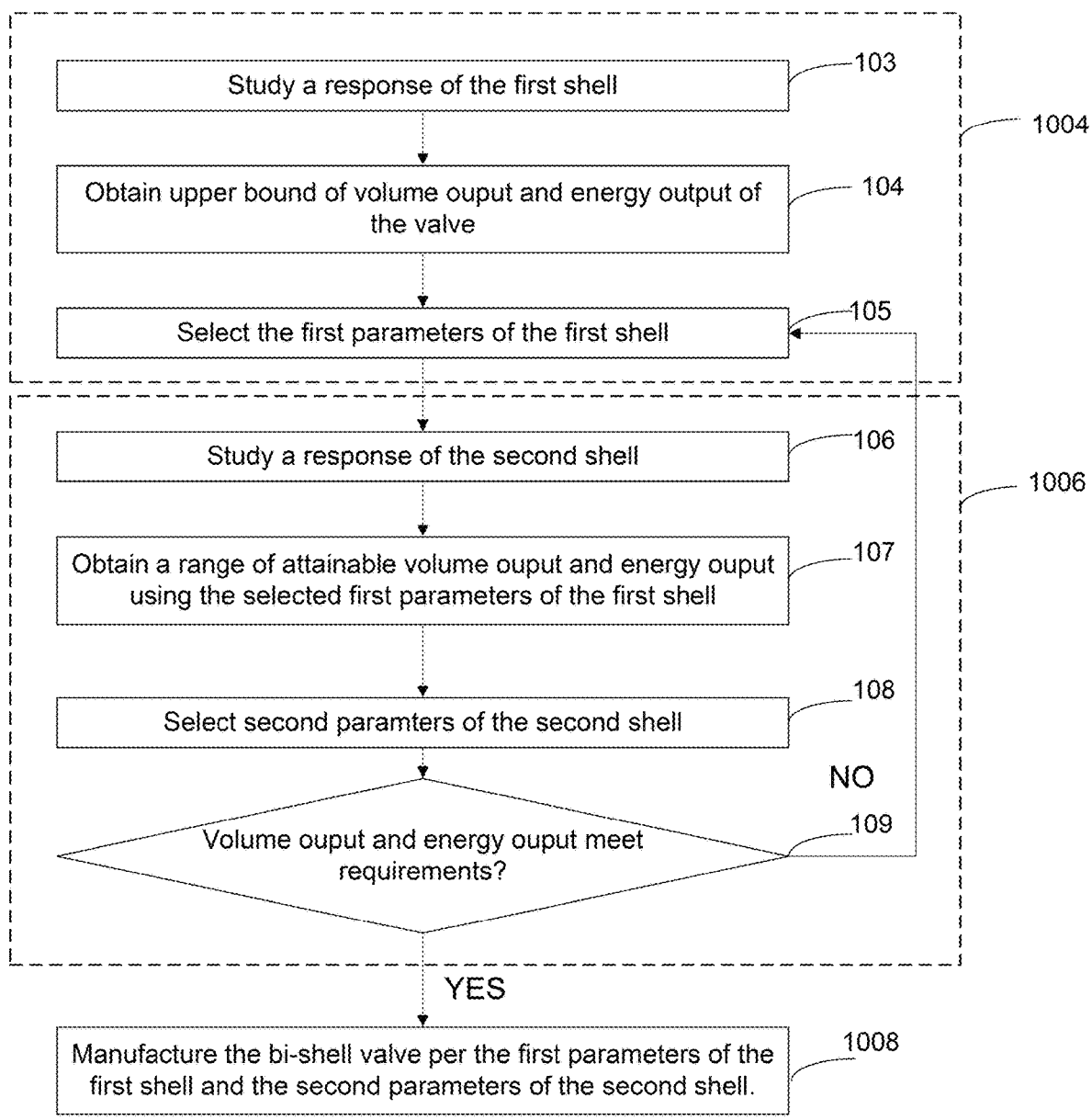
FIG. 10B is a flowchart illustrating steps of a method of designing the bi-shell valve of FIG. 3 in function of volume and energy requirements dictated by the pneumatic system of FIG. 1.

As shown in FIG. 10B, the step 1004 of determining the first parameters of the first shell 43 may include a step 103 of studying a response of the first shell 43 in function of selected parameters. The analysis may be done numerically through finite element. The finite element method (FEM) simulations may be carried with the commercial software package ABAQUS/STANDARD. The shell material may be modelled as an incompressible neo-Hookean solid. The Young's modulus and Poisson's ratio (1.23 MPa and 0.5) may be determined by fitting the simulation results with the experimental data. This may lead to the adoption of the following coefficients for our neo-Hookean model: C10=0.205 MPa and D1=0 MPa$^{-1}$. The modified Riks method may be employed to simultaneously solve for pressure and shell deformation. Since both shells exhibit only an axisymmetric mode of deformation, the numerical model may be built with axisymmetric elements (the two-node linear shell element SAX1 or the four-node bilinear quadrilateral element CAX4RH) to avoid the expensive computational cost of three-dimensional simulations. Although in some cases the second shell 44 may exhibit non-axisymmetric deformations, an axisymmetric analysis may be still be sufficient to retain a high level of accuracy. A fixed boundary condition at the peripheries of the shells and a uniform pressure at their surfaces may be imposed.

As described below, the computational analysis for each separate shell as well as for the bi-shell valve is conducted into two steps. First, an as-designed (ideal) model that is free from any manufacturing imperfections and does not account for any initial deformation caused by the clamping of the bottom ring is considered. In this scenario, the geometric space of the bi-shell valve is systematically explored to unveil its sensitivity to a varying shell geometry. Second, to validate the numerical model with experimental results, a set of realistic models may be developed, one for the spherical cap and the other for the imperfect shell. These models enable to capture the effect of the initial deformation due to clamping in spherical cap, and to incorporate as-manufactured imperfections, in particular thickness variations, in fabricated imperfect shells.

To carry the studying of the response of the first shell 43, the first shell 43 may be modelled with axisymmetric line element SAX1. A starting point for the geometry of the first shell 43 may be $t_1/R=0.05$, $h/R=0.2$, and R=25 mm. A mesh convergence study shows that 51 elements are sufficient to model the spherical cap. About 51 elements may be used for modeling the first shell 43. To systematically study the response of the first shell 43 with varying geometry, the geometry space defined by the normalized thickness $t_1/R$ ranging from 0.01 to 0.1 and the normalized height $h/R$ spanning from 0.1 to 0.5, and with the radius R at the base is fixed as R=25 mm may be explored.

The first shell 43 may be modelled with CAX4RH elements, whereas the acrylic plate that clamps the base of the cap may be modelled with rigid body line elements RAX1. Four elements through the thickness may be sufficient. Hence, we employ here at least four elements through the thickness.

The interaction between the cap and the plate may be set as "hard" contact with a friction coefficient of 0.5. To investigate the effects of the initial deformation due to clamping, we first apply a downward displacement on the plate, and then apply a pressure on the shell to deflate the shell. The displacement is systematically varied from 0 (no clamping) to 0.3 mm (tight clamping). When the cap is clamped through the plate for 0.3 mm, an upward displacement occurs at the top of the cap. It was found that the buckling pressure increases monotonically with the displacement of the clamping plate over a wide range of values from 403 Pa (no clamping) to 587 Pa (0.3 mm of clamping). From this set of results for the spherical cap, it was decided to include the initial deformation due to clamping in our realistic numerical model. To minimize the difference of results between experiments and simulations, the displacement due to clamping is set as 0.1026 mm. This enables to yield a buckling pressure close to that of the representative sample of the spherical cap, and to bring below 0.6% the relative error in the buckling pressure between simulation and experiment.

Any other suitable methods of exploring the response of the first shell 43 in function of its design parameters is contemplated without departing from the scope of the present disclosure. For instance, a plurality of first shell 43 may be manufactured with varying parameters and simulated experimentally to study their response. Based on this, a graph correlating the response of the first shell 43 may be obtained. This graph may guide a user in the selection of design parameters for the design of the first shell 43 in function of desired upper bound of the released volume and energy. This graph may be alternatively created as explained above by running numerical simulations of the first shell 43 by varying the design parameters to obtain the design space of the first shell 43.

The step 1004 of determining the first parameters of the first shell 43 may include a step 104 where the desired upper bound of the released volume and energy for the desired application of the valve 40 is determined. The step 1004 of determining the first parameters of the first shell 43 may include a step 105 where the design parameters of the first shell 43 are selected in function of the desired upper bound of the released volume and energy. Step 105 may include exploring the design space created at step 103 to select design parameters that will yield the desired upper bound of the released volume and energy.

Design of the Second Shell

At step 1006 of the method 1000, the second shell 44 is studied by modeling the as-designed imperfect shell using the axisymmetric shell element SAX1. The geometry of the second shell 44 may be defined by the following starting parameters: $t_2/R=0.05$, $\theta_L=20°$, $\theta_U=85.9°$, and R=25 mm. A wide design space is explored to investigate the buckling sensitivity to the as-designed defect in the form of an ellipse, with respect to the normalized thickness ($0.02 \leq t_2/R \leq 0.1$) and meridional angle at the upper and lower boundary of the defect ($20° \leq \theta_L \leq \theta_U \leq 85°$). A mesh convergence study shows that 81 SAX1 elements may be sufficient to model the second shell 44. In this work, an average of 81 elements are used for the second shell 44.

The second shell 44 is modeled as having a uniform thickness and clamped to the fixture plate. The plate is modelled as a rigid body with the axisymmetric rigid two-node line element RAX1. Since the clamped base of the second shell may be too thick to be considered as a shell, the axisymmetric quadrilateral element CAX4RH may be used instead of the SAX1 element. The mesh convergence study shows that four elements through the thickness may be sufficient for the second shell 44. Hence, at least four elements through the thickness are adopted. The interaction between the shell and the clamp is set as "hard" contact with a friction coefficient of 0.5. In the simulations, the initial deformation by imposing a vertical displacement on the plate is analysed first, and then apply a pressure on the shell to deflate the shell. The displacement of the plate is varied from 0 to 0.3 mm. It was observed that the deformation due to clamping is localized at the base, while the body of the shell is not affected.

The defect (e.g., elliptical arc) of the second shell 44 provides four buckling modes of the second shell 44. For a small defect, the defect of the second shell 44 undergoes the classical bifurcation buckling, which is characterized by a downward dimple at the pole of the hemisphere. The pressure increases rapidly to a high buckling pressure before dropping immediately to a low plateau. This is mode 1.

When the defect size increases, the buckling mode changes from the classical bifurcation mode to a snap-through buckling mode, which is characterized by a localized deformation that evolves mainly within the defect. This is mode 2. Similar to mode 1, the pressure attains the maximum at a small volume change.

For further increase of defect size, the maximum pressure is reached when the main deformation localizes below the defect. This is mode 3. Dissimilar from mode 1 and mode 2, the pressure in mode 3 gradually increases to the maximum at a much larger volume change. Depending on the shell geometry, the pressure may also show a plateau before the attainment of the maximum pressure.

In a special case, the shell buckles with a mixed mode that combines mode 2 and mode 3. The pressure shows a lower peak at a small volume change (limit point 1) before finally attaining the maximum value at a large change in volume (limit point 2).

It was observed that the domain boundaries demonstrate that to maximize the valve output, values of $\theta_U$ and $\theta_L$ falling within the zone of mode 3 and 4 should be preferred, as opposed to those of the other zone (mode 1 and 2), where the valve output is practically null. The cause for the difference may lie in the interaction between the first shell 43 and the second shell 44.

Hence, the step 1006 of determining the second parameters may include a step 106 of studying the response of the second shell 44. As explained above, this may be done by carrying a plurality of numerical or experimental simulations of the second shell 44 by varying its design parameters. The step 1006 of determining the second parameters may include a step 107 where the range of the attainable volume and energy output is calculated. The step 1006 of determining the second parameters may include a step 108 where the design parameters of the second shell 44 are selected to maximise the volume and energy output. At step 109, it is determined whether or not these volume and energy output are satisfactory for the selected application. If so, then the bi-shell valve 40 is completed and may be manufactured at 1008 using the selected parameters of both of the first shell 43 and the second shell 44. Otherwise, we return to step 1004 of the studying of the first shell 43 to change the design parameters of the first shell 43 and re-do step 1004 with the new parameters of the first shell 43. The process 1000 may be performed iteratively until design parameters of both shell allows the valve 40 to yield the desired volume and energy output for the selected application.

The released energy may be computed from the separate response of each shell as $$\Delta U^* = -\int_{\Delta V_{1(i)}}^{\Delta V_{1(ii)}} p_1 dV - \int_{\Delta V_{2(i)}}^{\Delta V_{2(ii)}} p_2 dV$$

where $\Delta V_{1(ii)} = \Delta V_{1(i)} + \Delta V^*$ and $\Delta V_{2(ii)} = \Delta V_{2(i)} - \Delta V^*$ are the volume changes at the post-snapping states, and where $p_1$ and $p_2$ are the pressure variations of the first and second shells respectively as discussed above with reference to FIGS. 5-7. The subscripts "1" and "2" denote respectively the first shell 43 and the second shell 44. The subscripts (i) and (ii) denote respectively the pre- and post-snapping states of the first and second shells.

After all of the parameters of the first shell 43 and of the second shell 44 are determined and satisfactory for the application of the valve 40, the valve 40 may be manufactured per the determined parameters.

It will be understood that the steps of designing of the valve 40 described above may be carried out using a processing unit and a computer-readable medium operatively connected to the processing unit and having instructions stored thereon and executable by the processing unit to: determine a required a volume output and a required energy output of the bi-shell valve in function of requirements of the pneumatic system; determine first parameters of the first shell in function of the determined required volume output and energy output; determine second parameters of the second shell in function of the first parameters and in function of the determined required volume output and energy output; and manufacture the bi-shell valve per the determined first parameters of the first shell and the determined second parameters of the second shell.

In the embodiment shown, the determining of the first parameters of the first shell includes generating a design space of the first shell. This may be done by performing simulations by successively varying the first parameters and obtaining a maximum volume output and a maximum energy output of the first shell for each of the first parameters. The first parameters may be a first ratio (t1/R) of a thickness of the first shell 43 to a radial distance between a periphery of the first shell 43 to the apex 43c of the first shell 43 and a second ratio (h/R) of a height of the first shell 43 from the periphery to the apex 43c and the radial distance R.

In the embodiment shown, the determining of the second parameters of the second shell 44 may include generating a design space of the second shell. This may be done by performing simulations by successively varying the second parameters and obtaining a volume output and an energy output of the bi-shell valve for each of the second parameters. The second parameters may include a third ratio (t2/R) of a thickness of the second shell 44 to a radial distance between a periphery of the second shell 44 to the apex 44f of the second shell 44, a lower angle $\theta_L$ extending from the periphery of the second shell 44 to a start of the defect in the second shell 44, and an upper angle $\theta_U$ extending along the defect of the second shell 44.

Then, an output volume and an output energy of the bi-shell valve 44 in function of the determined first parameters and the determines second parameters may be determined. And, if the output volume and the output energy correspond to the required output volume and the required output energy, the bi-shell valve 40 may be manufactured. If the output volume and the output energy are off from the required output volume and the required output energy, the steps above are repeated until the determined output volume and output energy of the bi-shell valve 40 correspond to the required output volume and the required output energy.

Alternate Designs

Figure 11:
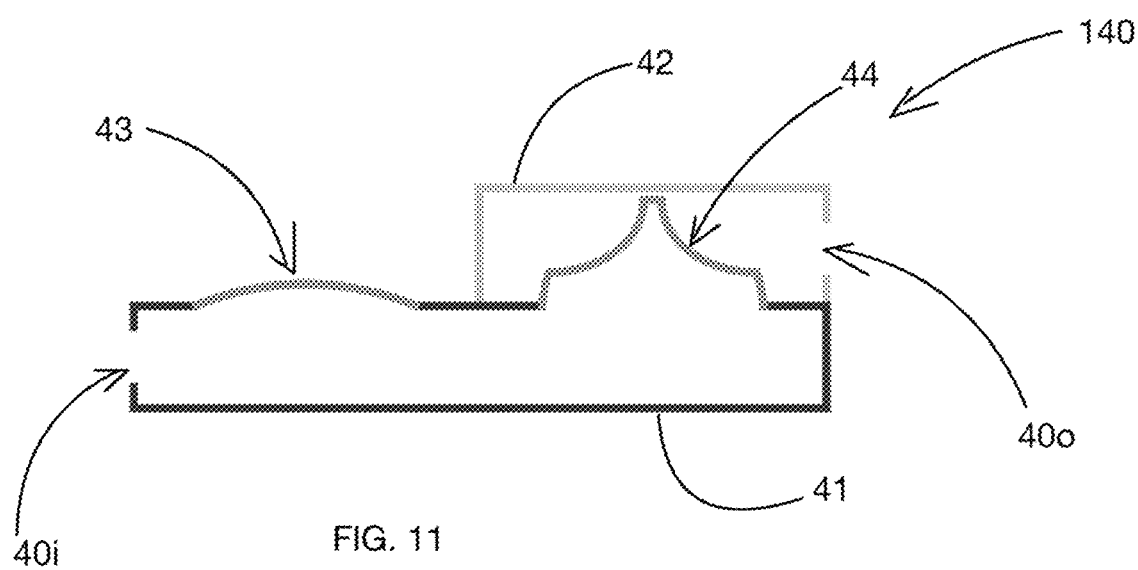
FIG. 11 is a cross-sectional view of a bi-shell valve in accordance with another embodiment shown in an undeformed state.
Figure 12:
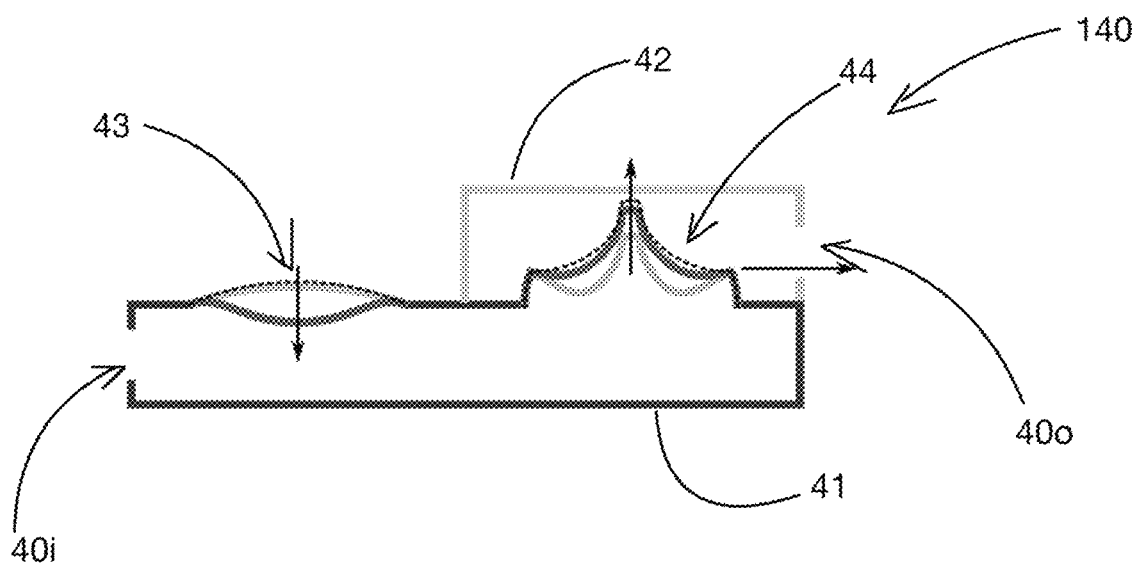
FIG. 12 is a cross-sectional view of the bi-shell valve of FIG. 11 shown in a deformed state.

Referring now to FIGS. 11-12, a bi-shell valve in accordance with another embodiment is shown at 140. The bi-shell valve 140 may be designed as a fuse of volume change by placing the second enclosure 42 above the second shell 44, rather than on the first shell 43. In this case, the volume output will initially increase with the volume input until a threshold is reached; at this stage the second shell 44 inflates with the snapping of the valve 140. In this embodiment, the first shell 43 is subjected to a pressure differential between the pressure in the first chamber 41a and the pressure of the environment outside both chambers. The second shell 44 is subjected to a pressure differential between the pressure of the first chamber 41a and the pressure of the second chamber 42a.

This valve 140 modifies the original bi-shell valve 40 by operating in a deflation mode in the position of the second chamber 42, which is here moved on the top of the second shell 44. In this configuration, before snapping, the second shell 44 can be deflated to generate a continuous volume output via the outlet 40o. When the second shell 44 is in the pre-snapping state, further deflation will trigger the snapping of the volume fuse, which reduces the volume change of the second shell 44. The outcome is a pneumatic fuse: the volume change of the second shell 44 at before snapping sets the threshold of volume output that the fuse cannot exceed.

Figure 13:
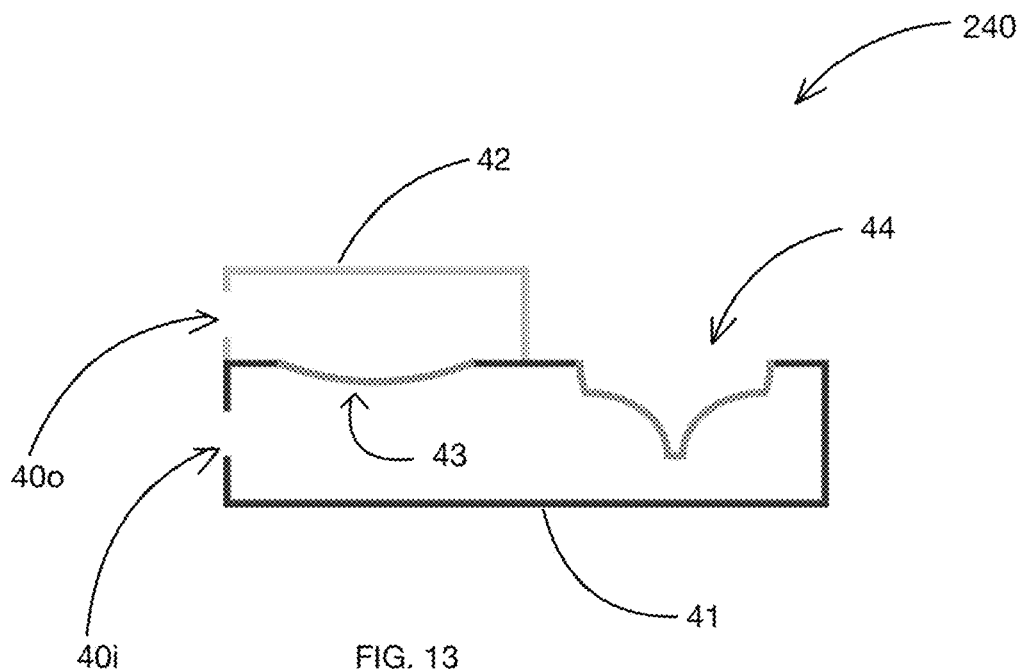
FIG. 13 is a cross-sectional view of a bi-shell valve in accordance with yet another embodiment shown in an undeformed state.
Figure 14:
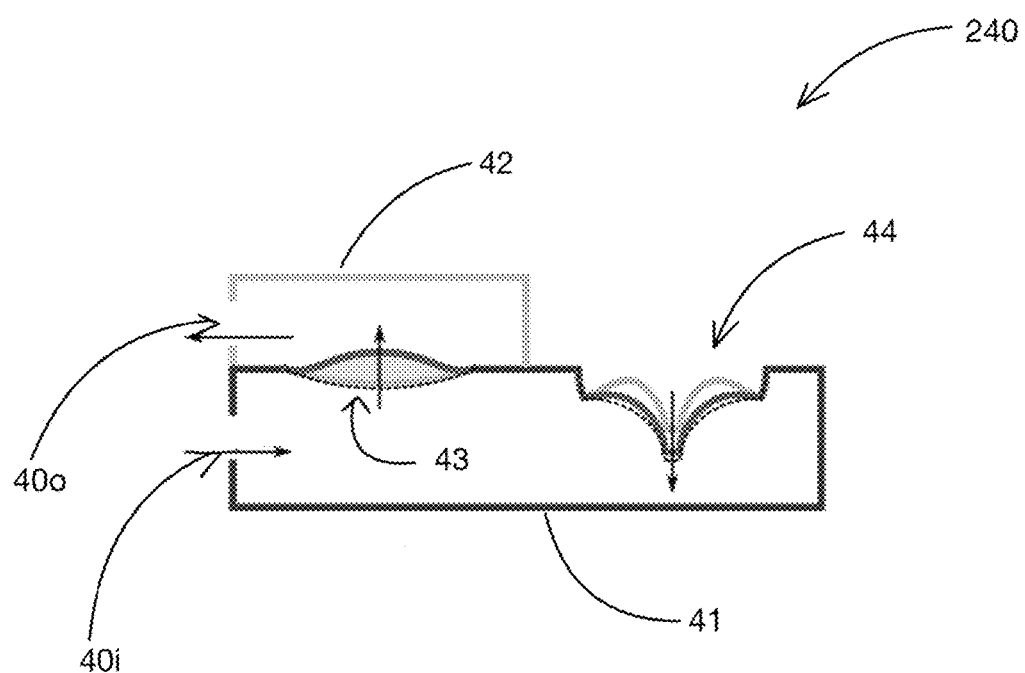
FIG. 14 is a cross-sectional view of the bi-shell valve of FIG. 13 shown in a deformed state.
Figure 15A:
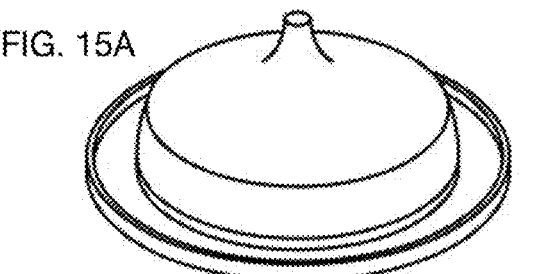
FIGS. 15a to 15f illustrate manufacturing steps for the first shell and the second shell of the bi-shell valve of FIG. 3.
Figure 15B:
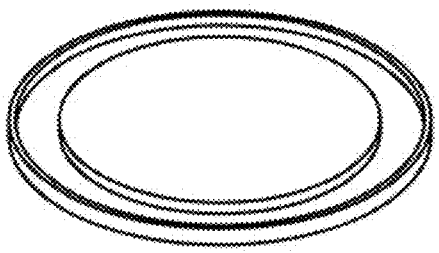
Figure 15C:
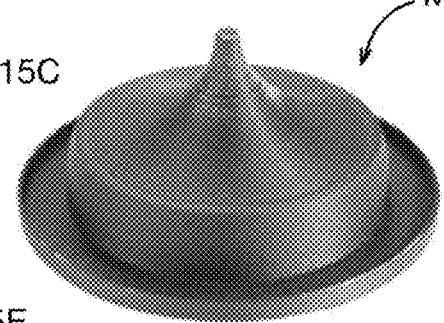
Figure 15D:
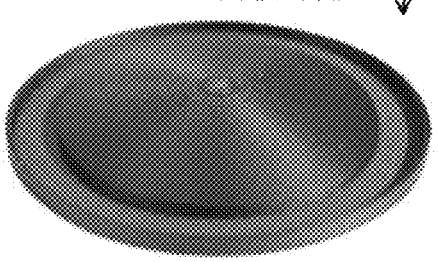
Figure 15E:
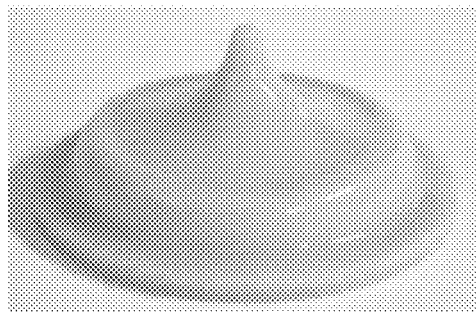
Figure 15F:
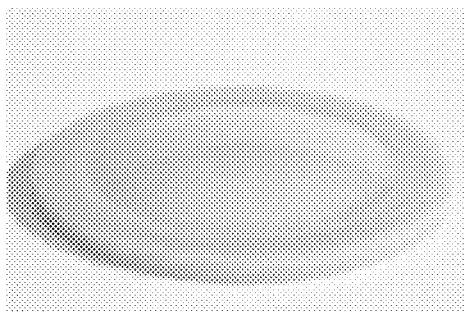

Referring now to FIGS. 13-14, a bi-shell valve in accordance with another embodiment is shown at 240. The valve 240 may offer inflation instead of deflation. Several pneumatic robots are actuated by inflation rather than deflation. By flipping the second shell 44 and the first shell 43 upside down, the bi-shell valve 240 can be reset to operate under inflation. In conclusion, the bi-shell valve concept introduced in this work along with its variational designs are poised to offer new routes to provide actuation of soft pneumatic actuators.

The original bi-shell valve 40 concept is here altered by flipping the two shells upside down. This valve works in inflation mode in a way similar to that of the original valve that operation in a deflation mode. When slowly inflated at the inlet 40i of the valve 240, the second shell 44 first inflates to store energy and volume change. Upon snapping, the second shell deflates so as to release energy and volume change, while the first shell 43 snaps upward. The valve 240 may provide a fast volume output for the rapid inflation of any actuator that may be connected to the outlet 40o.

Manufacturing

Referring to FIGS. 1-4, the first shell 43 and the second shell 44 may be made of Zhermack Elide Double 32™, or any other suitable materials such as elastomers, and soft materials with hyperplastic response. A material with an hyperplastic response is a material that is able to undergo a large deformation while being fully recoverable (i.e., no permanent set being accrued during the unloading phase). The first enclosure 41 and the second enclosure 42 may be made of acrylic or any other suitable material, such airtight materials like elastomers, glasses, plastics, ceramics, and metals. It will be appreciated that any other suitable materials may be used without departing from the scope of the present disclosure. The pneumatic circuit 30 may be made of PVC plastic tubing.

Referring to FIGS. 15a to 15f, the fabrication of the first shell 43 and of the second shell 44 is described. In the depicted embodiment, Elite Double 32 (Zhermack, Italy) is casted on the surface of 3D-printed molds M1, M2. For each shell, a 1 mm-thick mold with Onyx filament using fused deposition modeling (FDM) may be made. The surface of the molds has geometry identical to that of the as-designed elastic shells (R=25 mm h/R=0.2, $\theta_L$=20°, and $\theta_U$=85.9°), with a groove at the bottom to collect excessive deposition of liquid and form a thick band that provide a clamping action. To locally reduce excessive accumulation of Elite Double 32 liquid on the curved surface of the mold, a homemade spin coating unit is used to spin the mold at a speed of ~240 rpm. More specifically, the shells were fabricated at room temperature by following these steps: prepare the catalyst and base of Elite Double 32 with 1:1 volume fraction; mix and manually stir the prepared catalyst and base for ~1 min; turn on the power of the spin coating unit; slowly pour the mixed Elite Double 32 solution onto the mold; spin ~10 min to remove excessive liquid on the mold; turn off the power of the spin coating unit; wait about 15 min to fully cure the Elite Double 32 solution; systematically increase shell thickness by repeating the above steps a) to g) until the designed thickness is attained; repeat steps a) and b) and fill the groove at the bottom of the mold with mixed Elite Double 32 solution; wait ~25 min until the Elite Double 32 solution is fully stabilized; and peel off the elastic shell from the mold. Similar steps may be used to manufacture the shells using any suitable dimensions.

Valve Having a Single Input and Multiple Outputs

Figure 16:
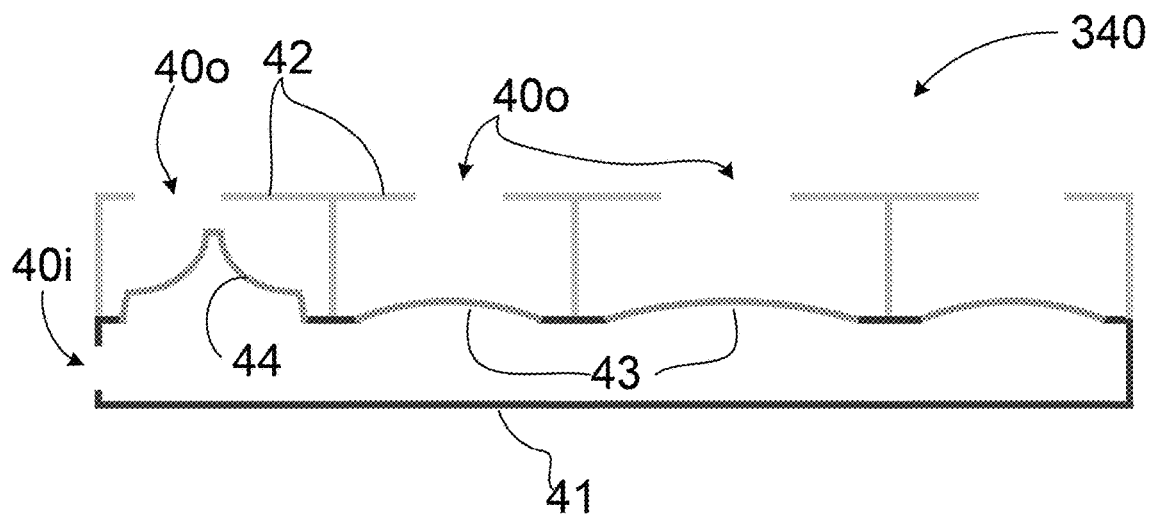
FIG. 16 is a cross-sectional view of a multi-shell valve in accordance with another embodiment.

Referring now to FIG. 16, a multi-shell valve, simply "valve" below, is shown at 340. The valve 340 includes a first enclosure 41 and a plurality of second enclosures 42. The first enclosure 41 defines an inlet 40i. A plurality of first shells 43 are subjected to a pressure defined within the first enclosure 41. A second shell 44 is subjected to the pressure defined within the first enclosure 41. Each of the second enclosures 42 defines a respective outlet 40o. In the embodiment shown, all of the shells, that are, the second shell 44 and the plurality of first shells 43, are exposed to a pressure within a respective one of the second enclosures 42. In use, the valve 340 may deliver a plurality of outputs at each of the outlets 40o from a single input at the inlet 40i. That is, a flow may be flown through the inlet 40i thereby deforming the second shell 44 from its initial position to its deformed position until the first shells 43 are exposed to a pressure differential strong enough to make them snap in their reversed positions, thereby generating a flow at each of the outlets 40o. The second shell 44 is designed to accommodate this sudden change of volume inside the first enclosure 41 as a result of the first shells 43 snapping in their reversed positions. The snapping of the first shells 43 results in the second shell 44 reverting back towards its initial position, thereby generating a flow at the outlet 40o of the second enclosure 42 that covers the second shell 44. Although the valve 340 is depicted as including three first shells 43 and a single second shell 44, the valve 340 may alternatively include more or less than three first shells 43 and/or more than one second shell 44. The outlet 40o defined by the second enclosure 42 that covers the second shell 44 may produce an oscillatory output. That is, if each of the first shells 43 is designed to snap at a respective pressure different than one another, the output generated by the second shell 44 may be oscillatory in time. In other words, this valve 340 may generate an output each time one of the first shells 43 snaps.

Figure 17:
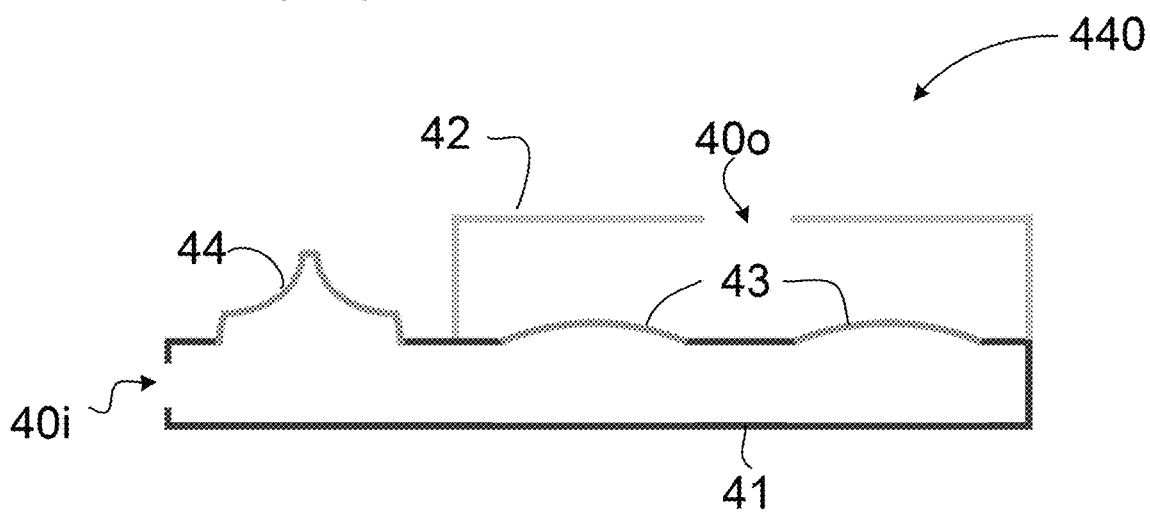
FIG. 17 is a cross-sectional view of a multi-shell valve in accordance with another embodiment.

Referring now to FIG. 17, a valve is shown at 440. The valve 440 includes a first enclosure 41 defining an inlet 40i of the valve 440 and a second enclosure 42 defining an outlet 40o of the valve 440. The valve 440 includes more than one, two in the embodiment shown but more than two is contemplated, first shells 43 both exposed to a pressure inside the second enclosure 42. The valve 440 includes a second shell 44 exposed to a pressure inside the first enclosure 41. Each of the first shells 43 is exposed to the pressure inside the first enclosure 41. The valve 440 may be used to provide a single stepwise output. In other words, a flow flowing through the inlet 40i may cause the first shells 43 to snap successively if the first shells 43 are designed to snap at different pressures.

Figure 18:
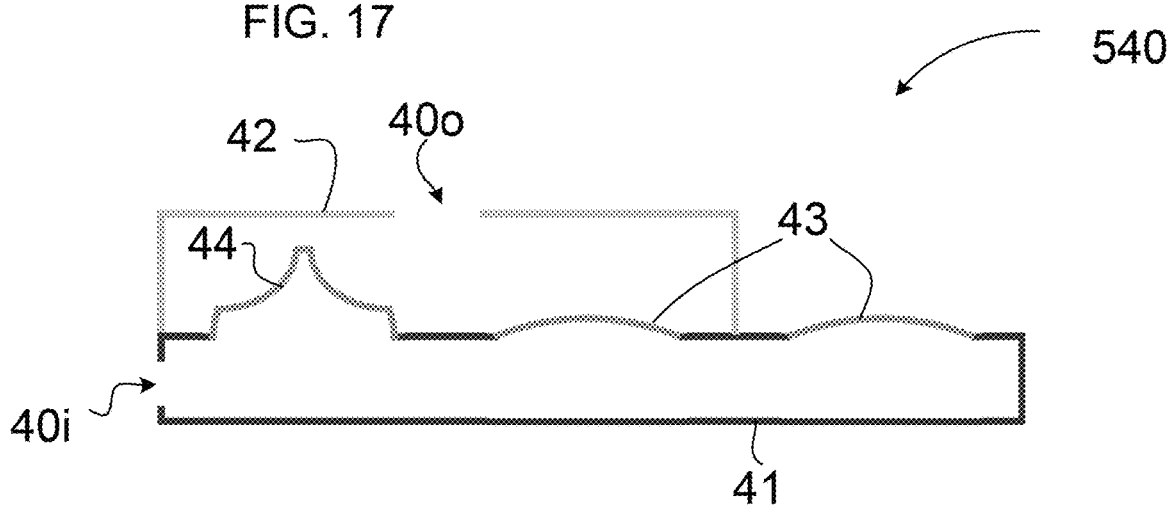
FIG. 18 is a cross-sectional view of a multi-shell valve in accordance with another embodiment.

Referring now to FIG. 18, another valve is shown at 540. The valve 540 includes a first enclosure 41 defining an inlet 40i of the valve 440 and a second enclosure 42 defining an outlet 40o of the valve 440. The valve 440 includes more than one, two in the embodiment shown but more than two is contemplated, first shells 43. The valve 440 includes a second shell 44 exposed to a pressure inside the first enclosure 41. Both first shells 43 and the second shell 44 are exposed to a pressure inside the first enclosure 41. One of the first shells 43 and the second shell 44 are exposed to a pressure inside the second enclosure 42. The other of the first shells 43 is exposed to a pressure of the environment outside both chambers. This valve 540 may be used to provide a mixed output. That is, when a flow flows through the inlet 40i, the pressure differential the first and second shells 43, 44 is exposed to increases. At some point, one of the two first shells 43 will snap thereby generating a reaction at the second shell 44, which will create an output at the outlet 40o. At some point, the other first shell 43 will snap, thereby generating another output at the outlet 40o.

Figure 19:
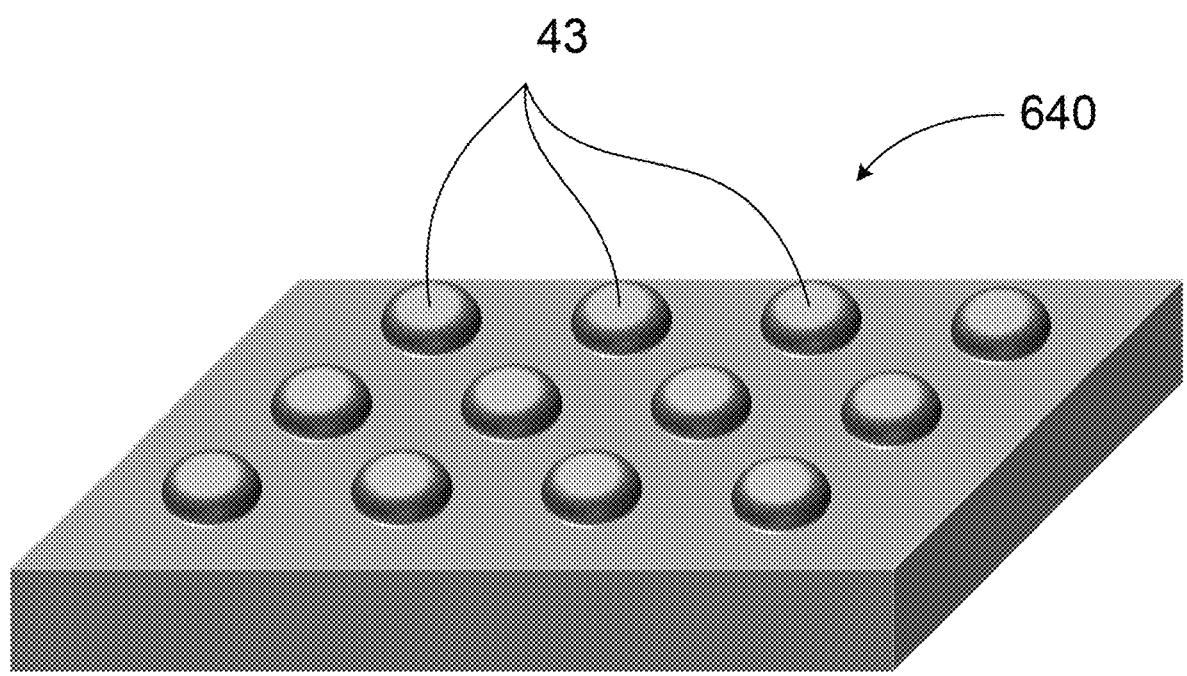
FIG. 19 is a three dimensional view of a tessellation of shells for a multi-shell valve.

Referring now to FIG. 19, a tessellation of first shells 43 is shown at 640. It is shown that the first shells 43 may be tessellated on a surface. Although only the first shells 43 are shown, the second shells 44 may also be tessellated on a surface.

Digital Logic Gates

Figure 20A:
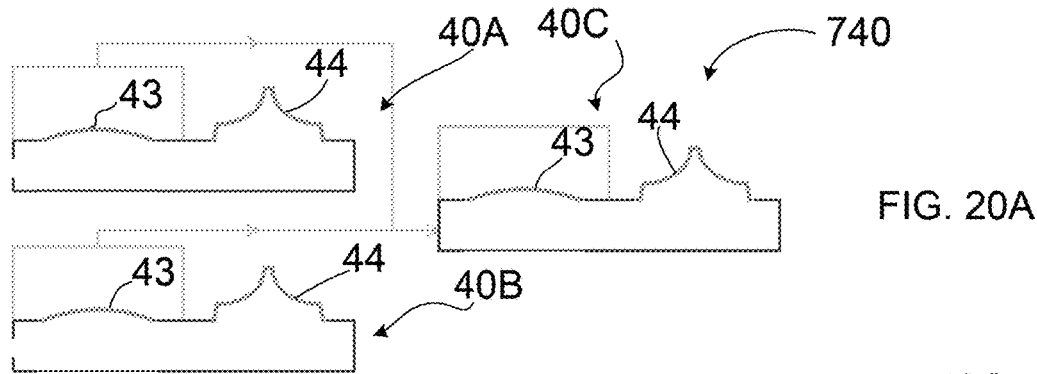
FIGS. 20A to 20D are cross-sectional views of an assembly of the bi-shell valves of FIG. 3 used to act as a AND gate in a pneumatic system, the gate shown in a plurality of configurations.
Figure 20B:
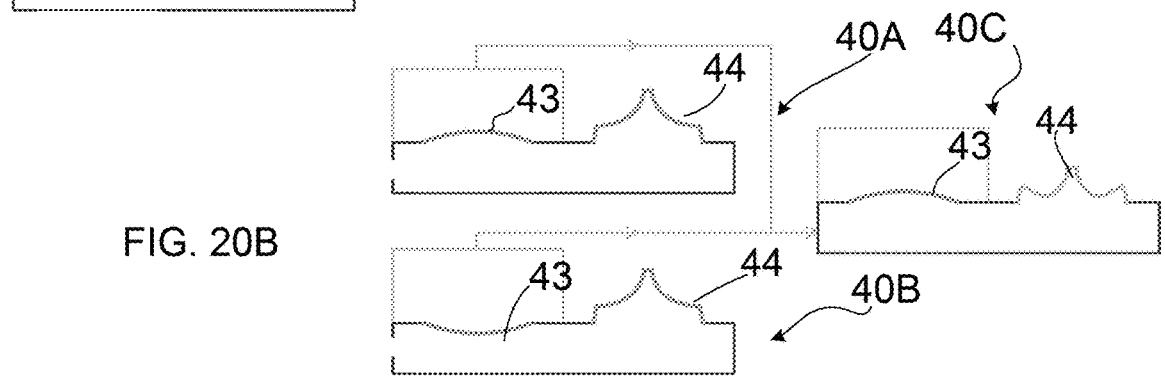
Figure 20C:
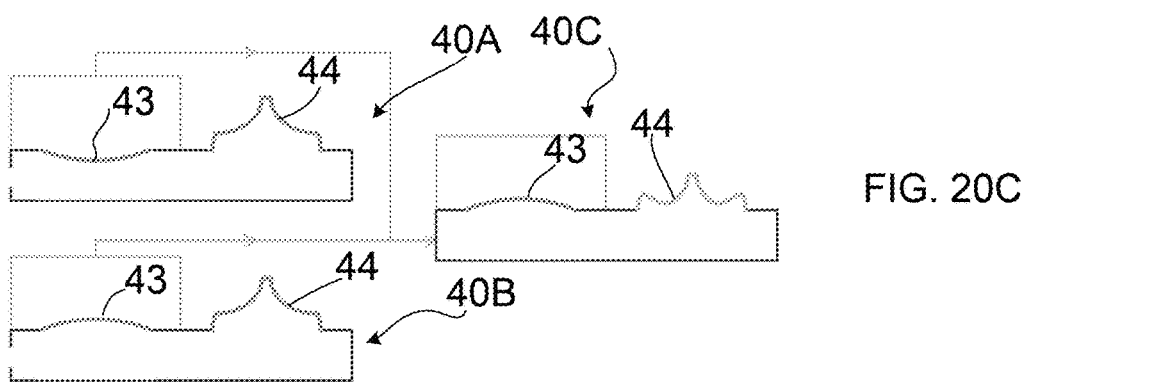
Figure 20D:
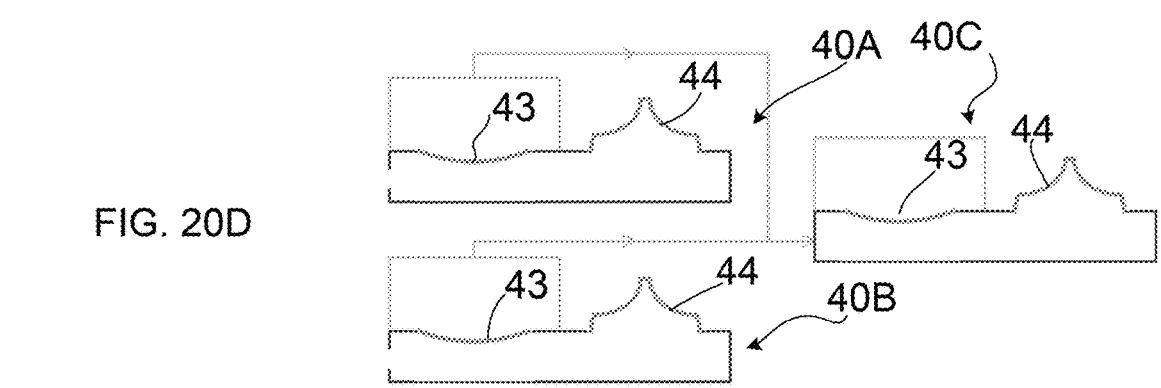

Referring now to FIGS. 20A to 20D, an AND gate is shown at 740. This gate may be used as part of a pneumatic system. The gate 740 includes three valves 40 as described above with reference to FIGS. 3-4. Namely, the gate 740 includes first and second valves 40A, 40B connected to a third valve 40C. The gate 740 is used to deliver an output at the outlet of the third valve 40C only if both of the first and second valves 40A, 40B deliver a respective output via their respective outlet. As shown, the outlets of the first and second valves 40A, 40B are fluidly connected to the inlet of the third valve 40C. As shown in FIG. 20A, no input is provided at the inlets of the first and second valves 40A, 40B, which results in no output provided at the outlet of the third valve 40C. In FIGS. 20B and 20C, an input is provided only at one of the first and second valves 40A, 40B. This input may trigger the snapping of one of the first shell 43 of the one of the first and second valves 40A, 40B, thereby generating an input at the third valve 40C. However, this input is only sufficient to cause partial deformation of the second shell 44 of the third valve 40C, but not enough to reach the required pressure to trigger the snapping of the first shell 43 of the third valve 40C. Hence, no output is provided by the third valve 40C. As shown in FIG. 20D, an input is provided at the inlets of both of the first and second valves 40A, 40B, thereby causing the snapping of the first shells 43 of the first and second valves 40A, 40B. The combined output generated by the first and second shells 40A, 40B is supplied as an input to the third shell 40C. This combined output is sufficient to trigger the snapping of the first shell 43 of the third valve 40C, thereby generated an output at the outlet of the third shell 40C.

Figures 21A, 21B, 21C, 21D:
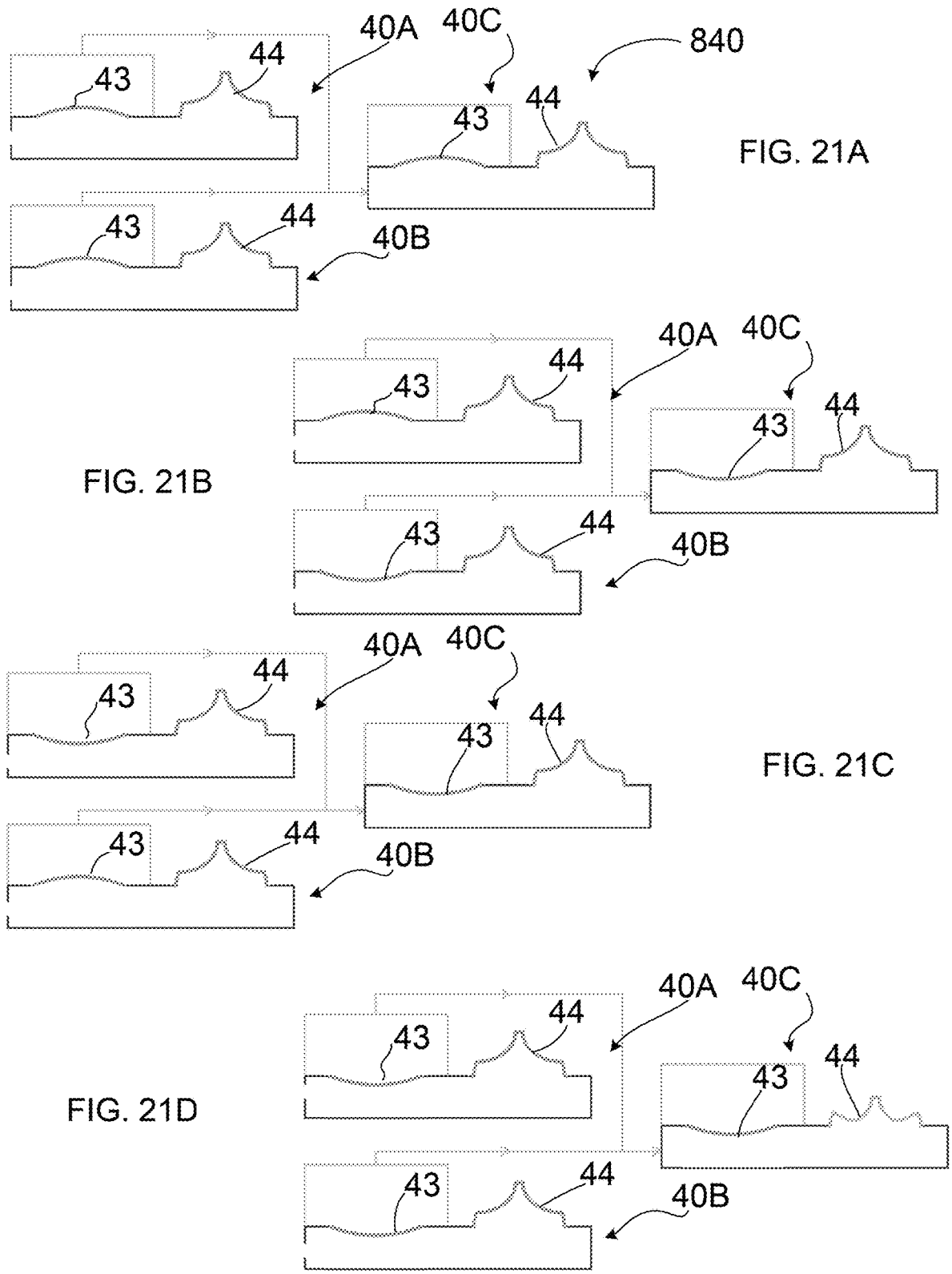
FIGS. 21A to 21D are cross-sectional views of an assembly of the bi-shell valves of FIG. 3 used to act as a OR gate in a pneumatic system, the gate shown in a plurality of configurations.

Referring now to FIGS. 21A to 21D, an OR gate is shown at 840. The gate 840 includes three valves 40 as described above with reference to FIGS. 3-4. Namely, the gate 840 includes first and second valves 40A, 40B connected to a third valve 40C. The gate 840 is used to deliver an output at the outlet of the third valve 40C if one or both of the first and second valves 40A, 40B deliver a respective output to an inlet of the third valve 40C via their respective outlet. As shown, the outlets of the first and second valves 40A, 40B are fluidly connected to the inlet of the third valve 40C. As shown in FIG. 21A, no input is provided at the inlets of the first and second valves 40A, 40B, which results in no output provided at the outlet of the third valve 40C. In FIGS. 21B and 21C, an input is provided only at one of the first and second valves 40A, 40B. This input triggers the snapping of one of the first shell 43 of the one of the first and second valves 40A, 40B, thereby generating an input at the third valve 40C. This input is sufficient to cause the first shell 43 of the third valve 40C to trigger the snapping of the first shell 43 of the third valve 40C. Hence, an output is provided by the third valve 40C. As shown in FIG. 21D, an input is provided at the inlets of both of the first and second valves 40A, 40B, thereby causing the snapping of the first shells 43 of the first and second valves 40A, 40B. The combined output generated by the first and second shells 40A, 40B is supplied as an input to the third shell 40C. This combined output is also sufficient to trigger the snapping of the first shell 43 of the third valve 40C, thereby generating an output at the outlet of the third shell 40C. In other words, the third valve 40C generates an output at its outlet if any of the first and second valves 40A, 40B generates an output.

Figure 22A:
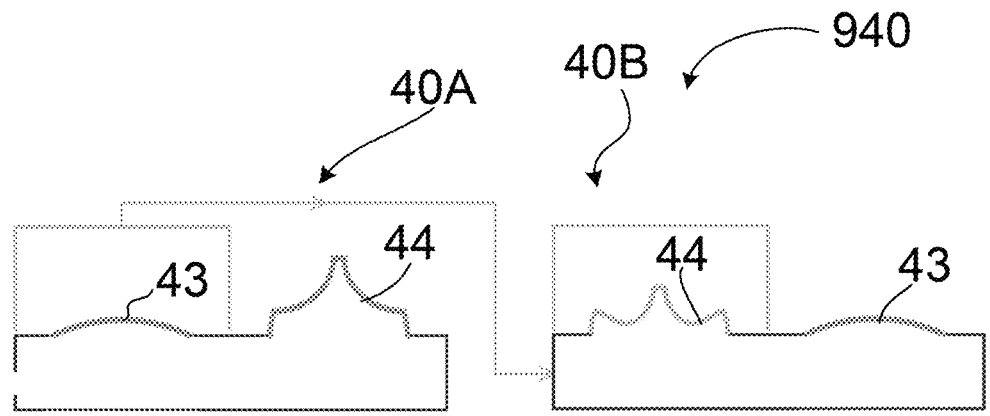
FIGS. 22A and 22B are cross-sectional views of an assembly of the bi-shell valves of FIG. 3 used to act as a NOT gate in a pneumatic system, the gate shown in a plurality of configurations.
Figure 22B:
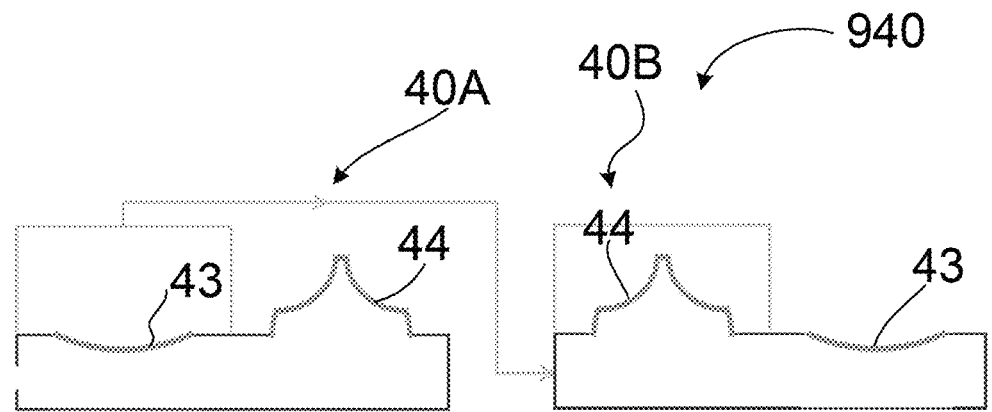

Referring now to FIGS. 22A and 22B, a NOT gate is shown at 940. The gate 940 includes two of the valves 40 described above with reference to FIGS. 3-4. An outlet of a first valve 40A is fluidly connected to the inlet of a second valve 40B. In the embodiment shown, an output is provided at the outlet of the second valve 40B if no input is provided at the inlet of the first valve 20B. Also, no output is provided at the outlet of the second valve 40B if an input is provided at the inlet of the first valve 40A. The second valve 40B is already deflated with a volume of air that is sufficient to deform the second shell 44 of the second valve 40B and to provide an output at the outlet of the second valve 40B, but it is insufficient to cause the snap of the first shell 43 of the second valve 40B. In FIG. 22B, when there is an input at the inlet of the first valve 40A, an output is provided at the outlet of the first valve 40A. Then, the second valve 40B has sufficient input to trigger the snapping of the first shell 43. With the snapping, the second shell 44 returns to the upward position and cancels out the output.

The disclosed valves may be used for other control methods such as: pressure control, manual inflation/deflation, pressure/volume input generated by temperature, dielectric elastomer, chemical decomposition/combustion, evaporation of low boiling point liquids, external mechanical manipulation, etc.

CONCLUSIONS

Widely used methods currently available for rapid actuation mainly resort to pressure-controlled strategies that require a bulky system of pressure supply, sensors, hard valves, and control algorithms. Other methods to achieve rapid actuation either employ explosive chemical reaction or exploit a structural instability embedded within the actuator, which would require the integration of snapping spherical caps or balloons into the architecture of the actuator.

In contrast, the disclosed bi-shell valve 40 may not rely on this large set of components or any modifications to the actuator design. It may be easily implemented with a simple volume input dispensed through a syringe, or any other suitable means, and connected to an existing robot. In addition, the performance of the disclosed valve 40 could not be achieved by employing one single shell, as in existing valve designs delivering mainly fluid control function. The valve 40 may offer self-adaptivity of its volume output to that of the actuator. Experiments have shown that the valve 40 may be autonomously adjusted to yield a volume output that is compatible with the volume of the actuator at the outlet. This may prevent the actuator from any possible damage caused by excessive deflation. Furthermore, the elasticity of the shells may ensure reversible and repetitive snapping through cyclic loop of deflation and inflation. It is understood that the choice to show the bi-shell valve 40 on a system containing rigid components is only for the convenience to observe the snapping event and the interaction of the constituent shells. The bi-shell valve 40 may be made fully soft by replacing the rigid components with their soft counterparts, and thus it may be embedded into soft robots in a straightforward manner.

There is disclosed a bi-shell valve that may provide volume-controlled rapid actuation to soft actuators. The valve may not resort to pressure control strategies, nor to any modifications to the body of the actuator that require chemical explosion or elastic instability. The valve engages snapping and shell interaction to generate a fast volume output upon a slow volume input. The bi-shell valve may thus perform a function that is unattainable by existing soft valves. The bi-shell valve may: be ready for use with volume control such that common soft robots can directly use this valve to achieve rapid motion under volume control, without any additional modifications to the body of the robot; output performance attuning such that the amount of fast volume output can be set in a fully passive way by programming the geometry of the constituent shells and their defects to maximize the valve performance and satisfy the functional requirements of a given soft robot; it may allow retainment of pre-snapping geometry such that the volume output of the valve is negligible before snapping, thus enabling the soft robot connected to our valve to preserve its initial undeformed state; and it may provide inlet flow rate insensitivity such that the fast volume output is not sensitive to the flow rate at the valve inlet, as the output is generated from the air transfer between the constituent shells during snapping.

Additional information about the described bi-shell valve may be found in "*Bi-Shell Valve for Fast Actuation of Soft Pneumatic Actuators via Shell Snapping Interaction*", Chuan Qiao, Lu Liu, Damiano Pasini, Advance Science 8.15 (2021), the entire contents of which are incorporated herein by reference in their entirety.

As can be seen therefore, the examples described above and illustrated are intended to be exemplary only. The scope is indicated by the appended claims.

The invention claimed is:

1. A valve for a pneumatic system, comprising:
   a first enclosure defining a first chamber and a first connection port of the valve, the first connection port communicating with the first chamber;

a second enclosure defining a second chamber and a second connection port of the valve, the second connection port communicating with the second chamber;

a first shell subjected to a first pressure differential between a pressure of the first chamber and a pressure of the second chamber or a pressure of an environment outside both of the first chamber and the second chamber, the first shell movable from a default position to a reversed position via snap-through buckling of a membrane of the first shell upon the first pressure differential reaching a threshold; and a second shell having a shape different than a shape of the first shell, the second shell resiliently movable from an initial position to a deformed position when subjected to a second pressure differential between the pressure of the first chamber and the other of the pressure of the second chamber and the pressure of the environment, wherein a first flow rate of a fluid via the first connection port induces deformation of the second shell from the initial position to the deformed position followed by a snapping of the first shell from the default position to the reversed position thereby generating a second flow rate of the fluid via the second connection port, and followed by a movement of the second shell back toward the initial position, the second flow rate greater than the first flow rate during a movement of the first shell from the default position to the reversed position.

2. The valve of claim 1, wherein the first shell is a spherical cap.

3. The valve of claim 1, wherein the first shell is made of an elastomeric material.

4. The valve of claim 1, wherein the second shell is a hemispherical cap with an axisymmetric defect.

5. The valve of claim 4, wherein the second shell is convex but for at the axisymmetric defect.

6. The valve of claim 5, wherein the second shell has a first section, a second section, and a third section between the first section and the second section, the axisymmetric defect located at the third section, the first section and the second section being defined by portions of a sphere.

7. The valve of claim 4, wherein the axisymmetric defect is defined by a concave portion of the second shell.

8. The valve of claim 4, wherein a profile of the axisymmetric defect is an elliptical arc.

9. The valve of claim 1, wherein the first shell separates the first chamber from the second chamber, the first pressure differential defined between the pressure of the first chamber and the pressure of the second chamber.

10. The valve of claim 1, wherein the second shell separates the first chamber form the second chamber, the second pressure differential defined between the pressure of the first chamber and the pressure of the second chamber.

11. The valve of claim 1, wherein the second enclosure is secured to the first enclosure.

12. A pneumatic system, comprising the valve of claim 1.

* * * * *